US012567959B2

(12) United States Patent
Vogel

(10) Patent No.: US 12,567,959 B2
(45) Date of Patent: Mar. 3, 2026

(54) SECURE PSEUDO-RANDOM NUMBER GENERATOR (PRNG) RESEEDING

(71) Applicant: Google LLC, Mountain View, CA (US)

(72) Inventor: Pirmin Robert Vogel, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/839,332

(22) PCT Filed: Feb. 21, 2022

(86) PCT No.: PCT/US2022/070752
§ 371 (c)(1),
(2) Date: Aug. 16, 2024

(87) PCT Pub. No.: WO2023/158500
PCT Pub. Date: Aug. 24, 2023

(65) Prior Publication Data
US 2025/0158811 A1 May 15, 2025

(51) Int. Cl.
*G06F 21/00* (2013.01)
*H04L 9/08* (2006.01)

(52) U.S. Cl.
CPC .......... *H04L 9/0869* (2013.01); *H04L 9/0825* (2013.01)

(58) Field of Classification Search
CPC ....... H04L 9/0869; H04L 9/0825; G06F 7/58; G06F 7/582; G06F 1/26; G06F 21/602
See application file for complete search history.

(56) References Cited

U.S. PATENT DOCUMENTS 9,548,862 B1 * 1/2017 Potter ................... H04L 9/0869
2006/0104443 A1 5/2006 Chari et al.
(Continued)

FOREIGN PATENT DOCUMENTS

CN      114035766 A    2/2022
JP      2001005383 A   1/2001
(Continued)

OTHER PUBLICATIONS

"International Preliminary Report on Patentability", Application No. PCT/US2022/070752, Aug. 27, 2024, 7 pages.
(Continued)

*Primary Examiner* — William A Corum, Jr.
(74) *Attorney, Agent, or Firm* — Colby Nipper PLLC

(57) ABSTRACT

This document discloses techniques, apparatuses, and systems for secure pseudo-random number generator (PRNG) reseeding. Integrated circuits (ICs) may use PRNGs to enable cryptographic processes that can protect an IC or electronic device against malicious attacks. Generally, an IC (e.g., a security circuit) may seed or reseed a PRNG with entropy useful to generate pseudo-random numbers or bits. In generating entropy, however, operation of the IC may change and result in circuit characteristics that allow attackers to determine when the IC operates on entropy-related secret information. In this way, attackers may identify moments when attacks have a higher chance of revealing the secret information. In aspects of secure PRNG reseeding, security circuitry may operate circuit elements to limit an association between circuit operations related to entropy generation and observable circuit characteristics. In doing so, the IC may implement cryptographic operations without enabling the detection of circuit operations on secret information.

20 Claims, 10 Drawing Sheets

(56) References Cited

U.S. PATENT DOCUMENTS

| | | | | |
|---|---|---|---|---|
| 2007/0230693 A1* | 10/2007 | Mueller | .................. | G06F 7/582 |
| | | | | 380/46 |
| 2007/0230694 A1 | 10/2007 | Rose et al. | | |
| 2010/0002877 A1* | 1/2010 | Zhang | .................. | H04L 9/0662 |
| | | | | 380/46 |
| 2010/0332574 A1 | 12/2010 | Herbert et al. | | |
| 2012/0179735 A1* | 7/2012 | Ferguson | .................. | G06F 7/58 |
| | | | | 708/254 |
| 2016/0127123 A1 | 5/2016 | Johnson | | |
| 2019/0050202 A1 | 2/2019 | Dale et al. | | |

FOREIGN PATENT DOCUMENTS

| | | | |
|---|---|---|---|
| JP | 2009506438 A | 2/2009 |
| JP | 2010525417 A | 7/2010 |
| WO | 2011148558 A1 | 12/2011 |
| WO | 2023158500 | 8/2023 |

OTHER PUBLICATIONS

"International Search Report and Written Opinion", Application No. PCT/US2022/070752, Oct. 18, 2022, 11 pages.

Abbasi, et al., "Challenges in Designing Exploit Mitigations for Deeply Embedded Systems", Jun. 17, 2019, 16 pages.

Chen, et al., "FPGA Implementation of SRAM PUFs Based Cryptographically Secure Pseudo-Random Number Generator", Feb. 16, 2018, 12 pages.

Tenentes, Vasileios, "Embedded Testing Architectures", Jun. 2013, 198 pages.

"Foreign Office Action", IN Application No. 202447054319, Aug. 28, 2025, 8 pages.

* cited by examiner

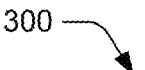
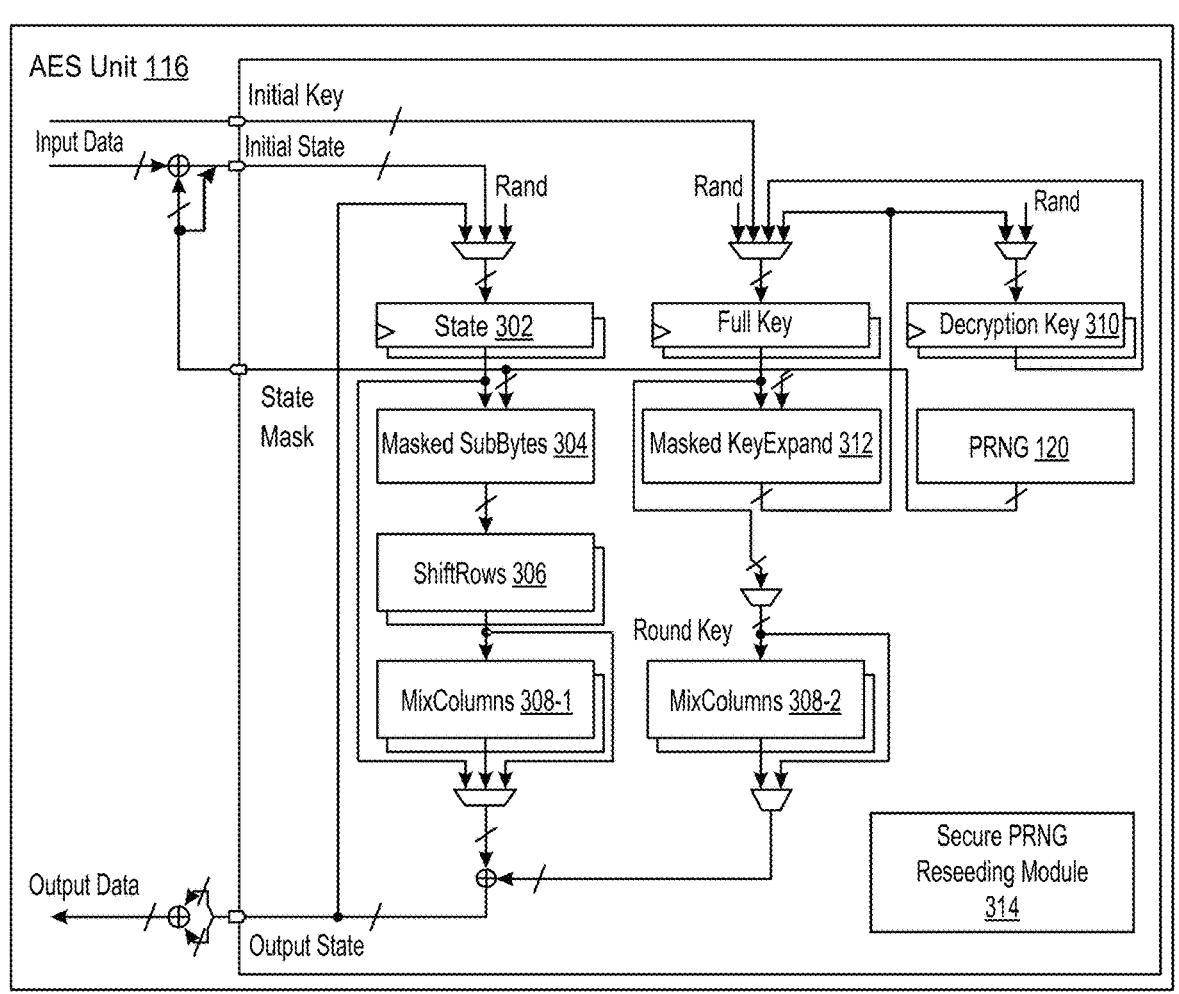
*FIG. 3*

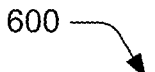

600

```
┌────────────────────────────────────────────────┐
│  Receive a request for entropy for reseeding a  │
│     PRNG-dependent cryptographic module         │
│                    602                           │
└────────────────────────────────────────────────┘
                       │
                       ▼
┌────────────────────────────────────────────────┐
│   Generate, with a random number generator and  │
│  based on an entropy source, the entropy for     │
│    reseeding the PRNG-dependent cryptographic    │
│                   module                         │
│                    604                           │
└────────────────────────────────────────────────┘
                       │
                       ▼
┌────────────────────────────────────────────────┐
│  Operate the PRNG-dependent cryptographic        │
│  module while generating the entropy for         │
│  reseeding the PRNG-dependent cryptographic      │
│  module to at least partially overlap respective │
│  power consumption of operating the PRNG-        │
│  dependent cryptographic module with generating  │
│  the entropy and operation                       │
│                    606                           │
└────────────────────────────────────────────────┘
                       │
                       ▼
┌────────────────────────────────────────────────┐
│  Provide the entropy generated with the random   │
│  number generator to the PRNG-dependent          │
│  cryptographic module to reseed the PRNG-        │
│  dependent cryptographic module for subsequent   │
│  cryptographic operations                        │
│                    608                           │
└────────────────────────────────────────────────┘
```

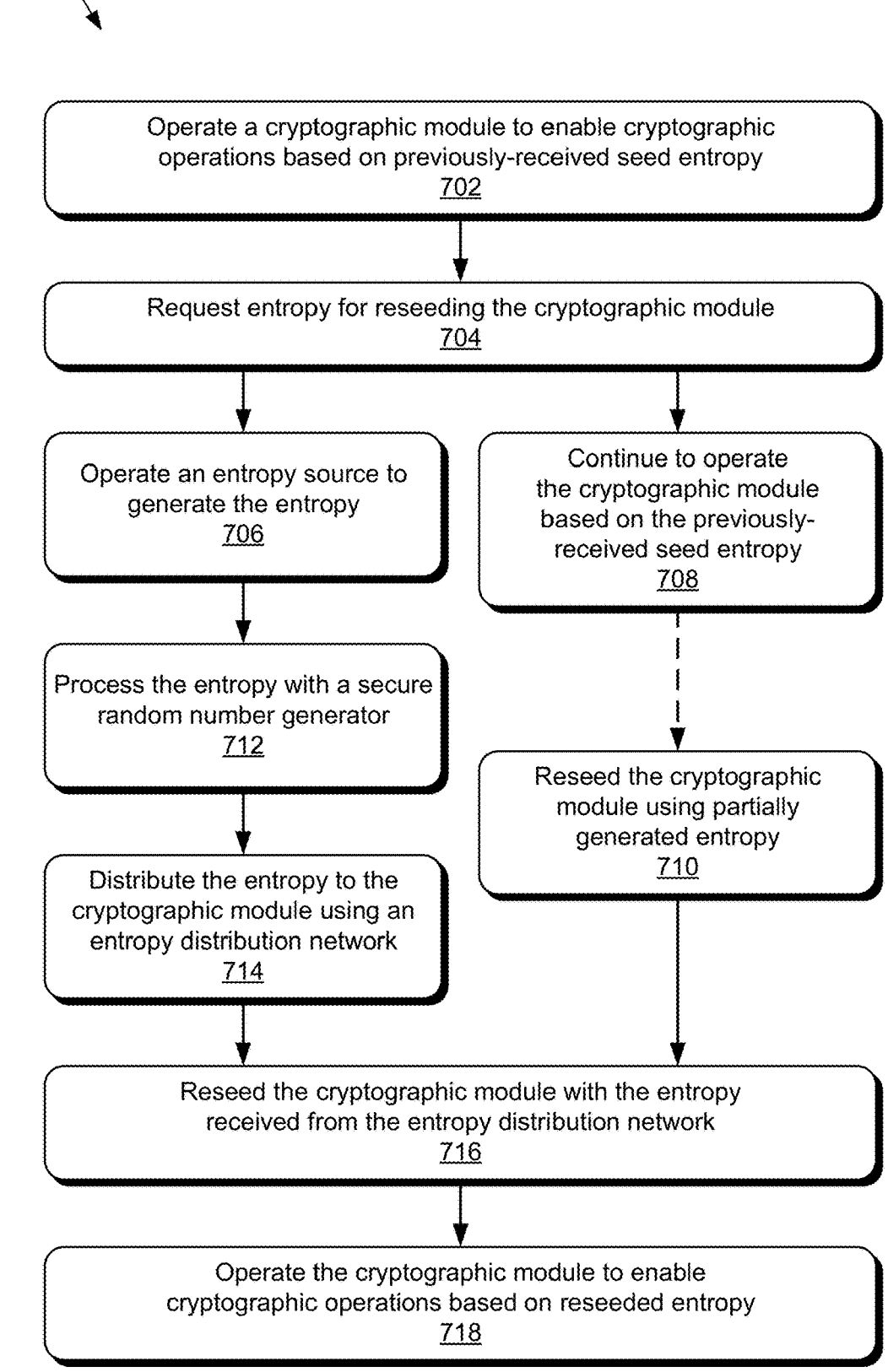

Operate a cryptographic module to enable cryptographic operations based on previously-received seed entropy
702

Request entropy for reseeding the cryptographic module
704

Operate an entropy source to generate the entropy
706

Continue to operate the cryptographic module based on the previously-received seed entropy
708

Process the entropy with a secure random number generator
712

Reseed the cryptographic module using partially generated entropy
710

Distribute the entropy to the cryptographic module using an entropy distribution network
714

Reseed the cryptographic module with the entropy received from the entropy distribution network
716

Operate the cryptographic module to enable cryptographic operations based on reseeded entropy
718

FIG. 7

SECURE PSEUDO-RANDOM NUMBER GENERATOR (PRNG) RESEEDING

RELATED APPLICATION(S)

This application is a national stage entry of International Application No. PCT/US2022/070752, filed Feb. 21, 2022, the disclosure of which is incorporated herein by reference in its entirety.

BACKGROUND

Electronic devices often include at least one integrated circuit (IC) that enables various functionalities on an electronic device. To perform some of these functionalities securely, an electronic device may store or operate with secret information that is restricted to certain access levels within the IC. To compromise or alter the operations of a device, however, attackers may attempt to gain unauthorized access to this secret information of the device. Existing approaches to prevent unauthorized access of ICs, however, are often inadequate to combat evolving software, hardware, and wireless attacks employed by malicious actors in attempts to access the secret information of electronic devices.

SUMMARY

This document discloses techniques, apparatuses, and systems for secure pseudo-random number generator (PRNG) reseeding. Integrated circuits (ICs) may use PRNGs to enable cryptographic processes that can protect an IC or electronic device against malicious attacks. Generally, an IC (e.g., a security circuit) may seed or reseed a PRNG with entropy useful to generate pseudo-random numbers or bits. In generating entropy, however, operation of the IC may change and result in circuit characteristics that allow attackers to determine when the IC operates on secret information. In this way, attackers may identify moments when attacks have a higher chance of revealing the secret. In aspects of secure PRNG reseeding, security circuitry may operate circuit elements to limit an association between circuit operations related to entropy generation and observable circuit characteristics. In doing so, the IC may implement cryptographic operations without enabling the detection, malicious or otherwise, of circuit operations. Here the term "entropy" refers to data which is unpredictable (e.g. given the information available to an envisaged adversary), such as data which according to the laws of physics is fundamentally unpredictable (e.g. when the next particle is detected by a Geiger counter) or data which is unpredictable from a practical point of view (e.g. dependent on a physical phenomenon which is hard for the adversary to measure, e.g. the timing of an action by a human operator). An entropy source may be a noise source. The term "reseeding" refers to resetting the value of a seed used by a PRNG to generate random numbers.

In some aspects, a method for secure PRNG reseeding includes receiving a request for entropy for reseeding a PRNG-dependent cryptographic module (such as one which comprises a pseudo-random number generator (PRNG) configured to generate random numbers using a seed based on received entropy). In response to the request, entropy is generated for reseeding the PRNG-dependent cryptographic module. While the respective entropy generating operations are performed by an entropy complex (entropy source), the PRNG-dependent cryptographic module is operated to overlap at least a portion of power consumption associated with the generating of the entropy for reseeding the PRNG-dependent cryptographic module.

In some aspects, the PRNG-dependent cryptographic module is operated by performing cryptographic operations using a current (i.e. previously received) entropy based on a current (i.e. previously received) seed provided to the PRNG-dependent cryptographic module. In other aspects, the PRNG-dependent cryptographic module is operated by performing operations that generate a power signature that at least partially overlaps a power signature generated by the entropy generation process without performing cryptographic operations with the PRNG-dependent cryptographic module. For example, the PRNG-dependent cryptographic module may produce a power signature that masks the power signature generated by the entropy generation process to obscure operation of the random number generator during entropy generation. Alternatively or additionally, the power signature generated by the entropy generation process masks the power signature of the PRNG-dependent cryptographic module to obscure operation of the PRNG-dependent cryptographic module. In yet another aspects, the PRNG-dependent cryptographic module is configured to perform cryptographic operations using entropy that is less than the entropy requested by the cryptographic module.

Generating entropy for reseeding the PRNG-dependent cryptographic module may include generating one or more bits of entropy by an entropy source and processing the one or more bits of entropy by a cryptographically secure random number generator to create a greater number of bits of entropy than the one or more bits of entropy. The greater number of bits of entropy may then be distributed by an entropy distribution network to reseed the PRNG. In some implementations, the entropy generation may include operating one or more of the entropy source, the cryptographically secure random number generator, or the entropy distribution network during a same time interval as another of the entropy source, the cryptographically secure random number generator, or the entropy distribution network.

In various aspects, a system for secure PRNG reseeding may perform methods for secure PRNG reseeding as described herein. In some implementations, the system includes an integrated circuit that includes an entropy generation circuit configured to generate entropy for reseeding a PRNG-dependent cryptographic module. The PRNG-dependent cryptographic module may include a PRNG and may be configured to perform cryptographic operations using entropy provided by the PRNG, request entropy for reseeding the PRNG-dependent cryptographic module, and operate the PRNG-dependent cryptographic module to overlap at least a portion of power consumption associated with the generating of the entropy for reseeding the PRNG-dependent cryptographic module during generation of the entropy for reseeding the PRNG-dependent cryptographic module.

This Summary is provided to introduce simplified concepts for implementing secure PRNG reseeding. The simplified concepts are further described below in the Detailed Description. This Summary is not intended to identify essential features of the claimed subject matter, nor is it intended for use in determining the scope of the claimed subject matter.

BRIEF DESCRIPTION OF THE DRAWINGS

The details of one or more aspects of the described systems and methods for secure PRNG reseeding are described below. The use of the same reference numbers in different instances in the description and the figures indicate similar elements:

FIG. 3 illustrates an example Advanced Encryption Standard (AES) Unit that can implement secure PRNG reseeding in accordance with one or more aspects;

FIG. 5-1 illustrates an example timing diagram for secure PRNG reseeding in accordance with one or more aspects;

FIG. 5-2 illustrates an example timing diagram for secure PRNG reseeding in accordance with one or more aspects;

FIG. 5-3 illustrates an example timing diagram for secure PRNG reseeding in accordance with one or more aspects; and FIG. 6 illustrates an example method for secure PRNG reseeding in accordance with one or more aspects;

FIG. 7 illustrates an example method for continuing to operate a cryptographic module while entropy is generated for reseeding the cryptographic module.

DETAILED DESCRIPTION

Figure 1:
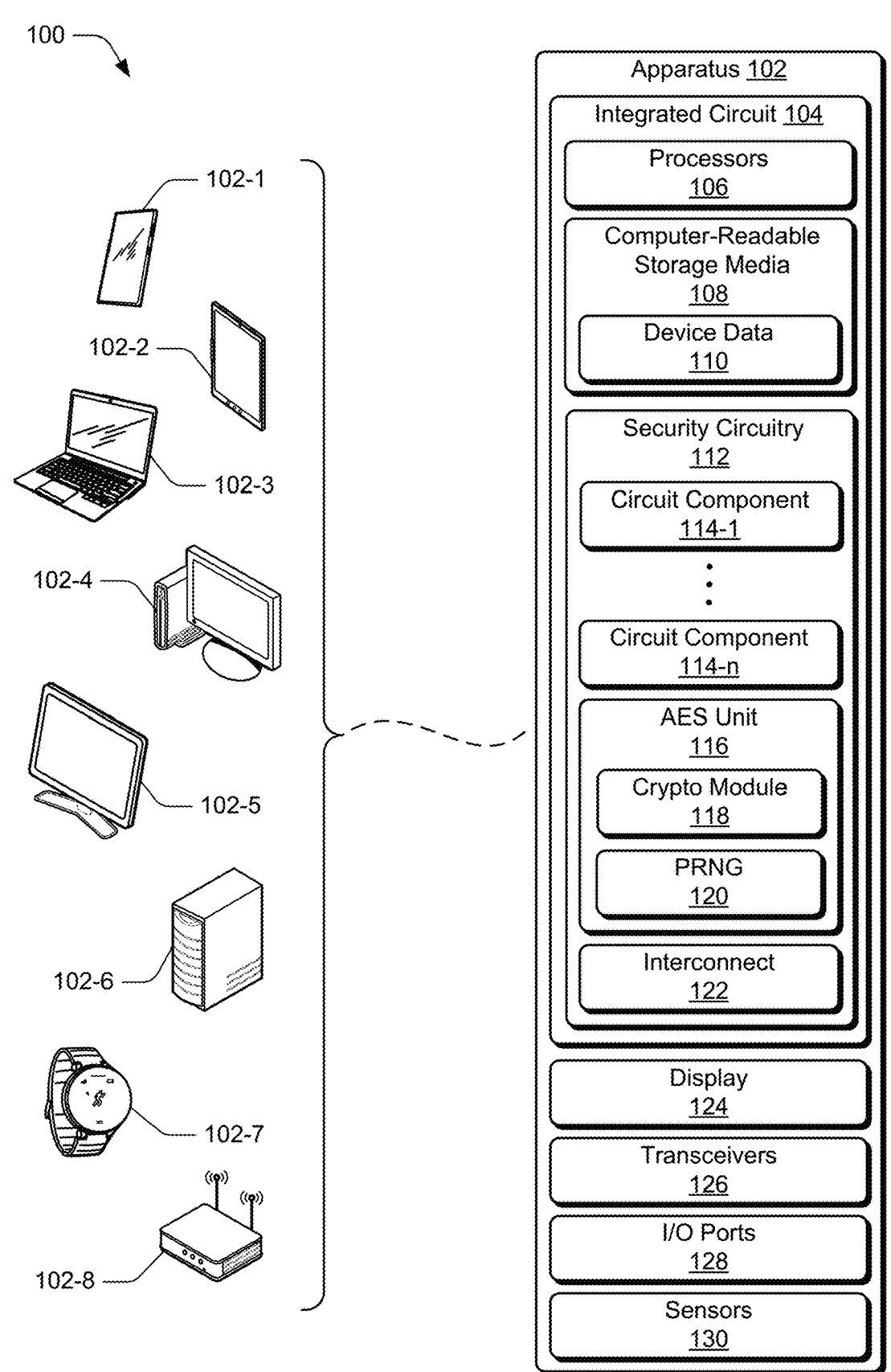
FIG. 1 illustrates an example operating environment that includes electronic devices that may implement secure PRNG reseeding.

In general, there are a variety of methods that attackers may use to retrieve privileged information about the cryptographic process of an integrated circuit. For example, side-channel analysis (SCA) may be used to extract secret assets (e.g., keys) by measuring, for example, power consumption, electromagnetic emanation, padding operation, or timing behavior of an integrated circuit in operation. In some cases, SCA can be effective because these channels (e.g., the power consumption, electromagnetic emanation, padding operation, or timing behavior of an integrated circuit) depend on the intermediate values being created and/or processed by the integrated circuit.

To mitigate SCA, many ICs include cryptographic modules that utilize randomness to perform cryptographic operations that increase security hardening. For example, cryptographic modules may utilize PRNGs to provide randomness that can be used as masks in Boolean masking to make these channels independent of the true values produced and/or processed by the integrated circuit. These PRNGs, however, may require reseeding to consistently produce entropy of the desired quality. Entropy generation can be an expensive process that requires significant time and thus, cryptographic modules utilizing the entropy may cease operation when high-quality entropy is not available.

While terminating execution of these cryptographic modules may reduce the power consumption of the circuit, this process can produce information leakage to potential attackers of the integrated circuit. For example, an attacker monitoring any channel of the circuit (e.g., the power consumption, electromagnetic emanation, padding operation, or timing behavior of an integrated circuit) may observe changes in circuit characteristics when the cryptographic module is deactivated. By observing these changes, the attacker may be able to determine when cryptographic processes are being performed within an IC. Since secret keys are often used to enable these cryptographic processes, revealed information about operation of the cryptographic module may allow attackers to determine the best time to initiate and terminate attacks to reveal the chip secrets.

To limit the leakage of information to attackers, controlled operation of the cryptographic module or the entropy generation process may enable security hardening. For example, a cryptographic module may continue to perform operations that create a power signature that is not indicative of deactivation. In aspects, masking does not require high-quality randomness with uniformity guarantees and thus, it may not be imperative to terminate execution of the cryptographic module when reseeding is requested. Therefore, the cryptographic module may continue cryptographic operations using randomness based on the current seed while entropy generation occurs. In this way, an attacker may be unable to determine when the cryptographic module is activated or deactivated, thereby hiding the handling of the cryptographic keys. Moreover, by performing a greater number of operations from multiple sources, the overall noise floor of the circuit characteristics will increase and make it more difficult for an attacker to recognize meaningful differences between circuit characteristics at different points in time.

Example Environment

FIG. 1 illustrates an example environment 100 that includes an apparatus 102 in which aspects of secure PRNG reseeding can be implemented. The apparatus 102 may be implemented as any suitable device, some of which are illustrated as a smart-phone 102-1, a tablet computer 102-2, a laptop computer 102-3, a gaming console 102-4, a desktop computer 102-5, a server computer 102-6, a wearable computing device 102-7 (e.g., smart-watch), and a broadband router 102-8 (e.g., mobile hotspot). Although not shown, the apparatus 102 may also be implemented as any of a mobile station (e.g., fixed- or mobile-STA), a mobile communication device, a client device, a user equipment, a mobile phone, an entertainment device, a mobile gaming console, a personal media device, a media playback device, a health monitoring device, a drone, a camera, an Internet home appliance capable of wireless Internet access and browsing, an IoT device, and/or other types of electronic devices. The apparatus 102 may provide other functions or include components or interfaces omitted from FIG. 1 for the sake of clarity or visual brevity.

The apparatus 102 includes an integrated circuit 104 that utilizes one or more processors 106 and computer-readable media (CRM 108), which may include memory media or storage media. The processors 106 may be implemented as a general-purpose processor (e.g., of a multicore central-processing unit (CPU) or application processor (AP)), an application-specific integrated circuit (ASIC), graphics processing unit (GPU), or a system on chip (SoC) with other components of the apparatus 102 integrated therein. The CRM 108 can include any suitable type of memory media or storage media, such as read-only memory (ROM), programmable ROM (PROM), random access memory (RAM), dynamic RAM (DRAM), static RAM (SRAM), or Flash memory. In the context of this discussion, the computer-readable media 108 of the apparatus 102 is implemented as at least one hardware-based or physical storage device, which does not include transitory signals or carrier waves. Applications, firmware, and/or an operating system (not shown) of the apparatus 102 can be embodied on the computer-readable media 108 as processor-executable instructions, which may be executed by the processor 106 to provide various functionalities described herein. The computer-readable media 108 may also store device data 110, such as user data or user media that is accessible through the applications, firmware, or operating system of the apparatus 102.

In this example, the integrated circuit 104 contains security circuitry 112. The apparatus 102, the integrated circuit 104, or the security circuitry 112 may implement a secure cryptographic processor. The security circuitry 112 may be implemented using one or more circuit components 114, for example, circuit component 114-1 through circuit component 114-*n*. The circuit components 114 may be organized to perform any number of operations to enable functionality of the apparatus 102. Examples of circuit components include a processor and multiple functional components as described in FIG. 2. The security circuitry 112 can be realized as, for example, a protected enclave, a trusted chip platform, a hardware-based root of trust (RoT) chip (e.g., a silicon RoT), and so forth. Regardless of how or where the security circuitry 112 is incorporated into an electronic device, the security circuitry 112** may counter many different types of attacks.

The security circuitry 112 may include one or more advanced encryption security (AES) unit 116 that may perform cryptographic operations of the integrated circuit 104. In aspects, the AES unit 116 may implement one or more PRNG-dependent cryptographic modules 118 that utilize a PRNG 120 to perform cryptographic operations, e.g., an operation of encrypting data or decrypting data; the data may for example be image data (e.g. captured by a camera or video camera) or sound data (e.g. captured by a microphone). In one example, the PRNG values may be used to generate a private/public key pair. The public key is transmitted out of the apparatus 102 via the transceivers 126 and/or the I/O ports 128. The private key may be used to decrypt data (e.g. image/sound data) received by the apparatus 102 via the transceivers 126 and/or the I/O ports 128, and which is encrypted using the public key. Alternatively or additionally, data (e.g. obtained using the sensors 130), such as image or sound data, may be hashed using the private key to generate a hash digest, and the data and the hash digest may be transmitted out of the apparatus 102, via the transceivers 126 and/or the I/O ports 128, such that the hash digest functions as a signature for the data, which a third party can verify using the public key. In another example, the cryptographic module 118 may perform Boolean masking and remasking operations on data operated on by the integrated circuit 104 based on pseudo-randomness provided by the PRNG 120. In aspects, the crypto module 118 and/or PRNG 120 may be implemented as or with a secure PRNG reseeding module (not shown, e.g., FIG. 4), which may implement methods described herein. The PRNG 120, however, may require reseeding to consistently produce entropy of the desired quality. Over time, pseudo-randomness provided by the PRNG 120 may become deterministic and therefore, the cryptographic operations performed based on the pseudo-randomness may be ineffective to protect against various attacks. To ensure the quality of the pseudo-randomness utilized by the cryptographic modules 118, fresh entropy may be generated and consumed to reseed the PRNG 120.

The AES unit 116 may handle device secrets that are used to ensure the appropriate usage and performance of the integrated circuit 104, for example, cryptographic keys or other privileged information. To protect the privileged information handled by the AES unit 116, cryptographically secure operations may be performed to protect against various attacks that may release device secrets or information about the integrated circuit 104.

As shown, the security circuitry 112 is coupled to an interconnect 122. The interconnect 122 can be realized using, for example, a bus, a switching fabric, or a bus network that enables the various circuit components to communicate. Each of the circuit elements may be directly or indirectly coupled to the interconnect 122.

The apparatus 102 may also include a display 124, transceivers 126, input/output ports (I/O ports 128) and/or sensors 130. The display 124 may be operably coupled with one of the processors 106 (e.g., graphics processing unit (GPU)) and configured to graphically present an operating system or applications of the apparatus 102. The transceivers 126 may be configured to enable wired or wireless communication of data (e.g., device data 110) over wired or wireless networks according to any suitable communication protocol. The I/O ports 128 of the apparatus 102 may include universal serial bus (USB) ports, coaxial cable ports, and other serial or parallel connectors (including internal connectors) useful to couple the electronic device to various components, peripherals, or accessories such as keyboards, microphones, or cameras.

The apparatus 102 also includes sensors 130, which enable the apparatus 102 to sense various properties, variances, stimuli, or characteristics of an environment in which the apparatus 102 operates. For example, the sensors 130 may include various motion sensors, ambient light sensors, acoustic sensors, capacitive sensors, infrared sensors, temperature sensors, radar sensors, or magnetic sensors. In aspects, the sensors 130 may be used to generate entropy for reseeding the PRNG 120. Alternatively or additionally, the sensors 130 may enable interaction with, or receive input from, a user of apparatus 102, such as through touch sensing or proximity sensing.

Example Circuit Components

Figure 2:
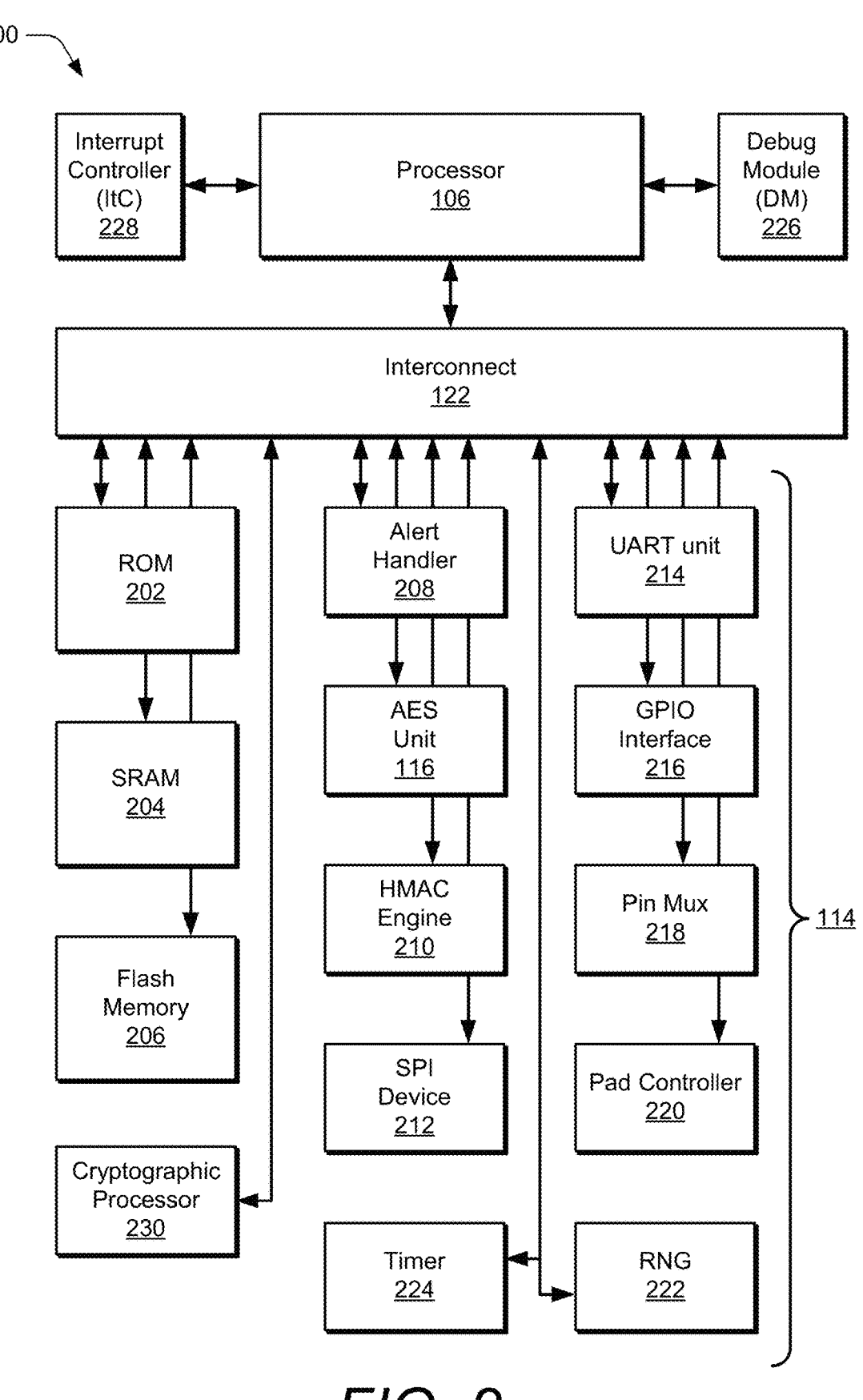
FIG. 2 illustrates example security circuitry that includes multiple circuit components that can be implemented to support aspects of secure PRNG reseeding.

FIG. 2 illustrates at 200 an example processor 106 and example security circuitry 112 that includes multiple circuit components, including multiple example circuit components 114 that can be implemented to support aspects of secure PRNG reseeding. As shown, the security circuitry 112 includes a processor 106 that is coupled to an interconnect 122. Each of the processor 106, the multiple memories, and the multiple other circuit components 114 may be directly or indirectly coupled to the interconnect 122. In aspects, the components of FIG. 2 may be embodied as a secure computing platform or a secure System-on-Chip that implements a root-of-trust and/or other secure cryptographic features.

In example implementations, the multiple memories can include a read-only memory (ROM 202), a static random-access memory (SRAM 204), and a flash memory 206. In aspects, the ROM 202, SRAM 204, or the flash memory 206 may be implemented within the security circuitry 112 or within the CRM (e.g., CRM 108). The multiple components 114 can include an alert handler 208, an advanced encryption standard (AES) unit (AES unit 116), a hash-based message authentication code (HMAC) engine (HMAC engine 210), and a serial peripheral interface (SPI) device (SPI device 212). The multiple components 114 can also include a universal asynchronous receiver/transmitter (UART) unit (UART unit 214), a general-purpose input/output (GPIO) interface (GPIO interface 216), a pin multiplexer (pin mux 218), and a pad controller 220. The multiple components 114 can further include a random number generator (RNG 222) and a timer 224. Additionally, the components 114 can include any of the memories, as shown in FIG. 2. Although certain examples of memories and other components 114 are depicted in FIG. 2 or described herein, a given implementation of the security circuitry 112 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 112 may include at least one clock generator to generate the clock signals or may include reset circuitry to reset one or more individual components independently of each other, multiple components jointly, or an entire IC chip. Alternatively, the security circuitry 112 may receive at least one clock signal or a reset signal from a source that is external to the security circuitry 112, which source may or may not be on a separate chip. One or more separate components 114 may operate in respective individual clock domains. For instance, circuit components may be synchronized to a clock that is local to a respective component. Components in different clock domains may operate or communicate asynchronously with respect to one another.

Example implementations of the illustrated components are described below. The processor 106 may be realized as a "main," "central," or "core" processor for the security circuitry 112. The processor 106 may, by way of example only, be implemented with a 32 bit, in-order reduced instruction set computing (RISC) core with a multi-stage pipeline. With, e.g., a RISC-V functionality, the processor may implement an M (machine) and a U (user) mode. Activating a reset pin (not shown) (e.g., through de-assertion of an active-low reset pin) causes the processor 106 to exit reset and begin executing code at its reset vector. The reset vector may begin in the ROM 202, which validates code in the emulated embedded flash (e flash) before jumping to it. In other words, the code is expected to have been instantiated into the e flash before the reset is released. In some cases, resets throughout the security circuitry 112 can be made asynchronous active-low as per a comportability specification to support interoperability among the various circuit components. A reset may be generated by the alert handler 208 as a security countermeasure; by a watchdog timer; and so forth. Reset signals may also be sent to other circuit components, such as one of the memories or one of the other components 114.

Coupled to the processor 106 are a debug module 226 (DM) and an interrupt controller 228 (ItC), either of which may also be made comportable. The debug module 226 provides debug-access to the processor 106. By interfacing with certain pins of the IC, logic in the debug module 226 allows the processor 106 to enter a debug mode and provides an ability to inject code into the device (e.g., by emulating an instruction) or into a memory. The interrupt controller 228 may be disposed proximate to the processor 106. The interrupt controller 228 can accept a vector of interrupt sources from within the security circuitry 112. The interrupt controller 228 can also assign leveling and priority to the interrupts before forwarding them to the processor 106 for handling.

The processor 106 can provide any desired level of performance or include any internal circuit components. For example, the processor 106 can include at least one arithmetic logic unit (ALU) (e.g., including an "additional" ALU to calculate branch targets to remove a cycle of latency on taken conditional branches) and multiple pipeline stages.

With multiple pipeline stages, a pipeline can perform register writeback to reduce a cycle of latency from loads and stores and prevent a pipeline stall where a response to a load or store is available the cycle after the request. The processor 106 can implement a single-cycle multiplier or produce an imprecise exception on an error response to a store, which allows the processor to continue executing past the store without waiting for the response. Although not depicted, the processor 106 specifically, or the security circuitry 112 generally, can include an instruction cache to provide single-cycle access times for instructions.

In the illustrated example 200, the components of the security circuitry 112 includes or have access to three memory address spaces for instructions and data. The ROM 202 is the target for the processor 106 after release of a reset. The ROM 202 contains hard-coded instructions to perform a subset of platform checking before checking the next stage of code. The next stage of code—e.g., a boot loader stored in e-flash memory—can be the first piece of code that is not hard-coded into the silicon of the device. This next stage of code is, therefore, signature-checked for integrity to increase security. The ROM 202 can execute this signature check by implementing a Rivest-Shamir-Adleman-check (RSA-check) algorithm on the full contents of the boot loader.

The flash memory 206 can be implemented as e-flash memory for code storage. This e-flash can house the boot loader mentioned herein, as well as an operating system and applications that layer on top. The SPI device 212 can be used to bulk-load the e-flash memory. The debug module 226 may also be used for code loading. The SRAM 204 can be operated as a scratch pad SRAM that is available for data storage by the processor 106 (e.g., for stack and heap information). The SRAM 204 can also store code.

The security circuitry 112 can include circuit components 114 that may be subservient execution units that are coupled to the processor 106 via the interconnect 122. Each of these components 114 can follow an interface framework that ensures comportability with each other and with the processor 106. A comportability scheme can specify how the processor 106 communicates with a given circuit component (e.g., using the interconnect 122), how a circuit component communicates with the processor 106 (e.g., using interrupts), how a circuit component communicates security events (e.g., using alert indications) to other circuit components, like the alert handler 208; how a circuit component communicates with peripheral devices (e.g., through a chip I/O); or combinations thereof. The depicted components 114 can comprise circuit components relative to the alert-related functionality provided by the alert handler 208, relative to the processor 106, relative to one or more the memories, relative to a chip I/O, and so forth. Thus, the memories can also comprise components 114 relative to each other or the other depicted circuit components.

Circuit or chip I/O include the pin mux 218 and the pad controller 220. The pin mux 218 provides signaling routes between at least a portion of the components 114 and available multiplexable I/O nodes of the security circuitry 112 (e.g., pins of the chip in which the various components are integrated or an interface to other portions of an SoC). The pad controller 220 manages control or pad attributes like drive strength, technology, pull up versus pull down, and the like of each of the circuits' components. The pin mux 218 and the pad controller 220 may themselves be peripheral devices on the interconnect 122. Accordingly, each may have or may otherwise be associated with at least one collection of registers that provide software configurability.

The UART unit 214 can implement UART features, such as single-lane duplex UART functionality. The outputs and inputs thereof can be configured to connect to any circuit I/O via the pin mux 218. The GPIO interface 216 creates G bits of bidirectional communication to external circuitry via the pin mux 218, where G is a positive integer like 16, 32, or 64. Regarding memory I/O, the SPI device 212 can implement a firmware mode. Here, the firmware mode can enable a feature that provides the ability for external drivers to send firmware upgrade code into a bank of the flash memory 206 for in-field firmware updates. The firmware mode can include addressing of the memories using SPI transactions. Although not depicted, the security circuitry 112 can include an inter-integrated circuit (I2C) host to enable command of I2C devices. This command of I2C devices may include standard, full, and fast modes.

Several "core security" components are also depicted, including the encryption engines and the alert handler 208. The AES unit 116, which may be implemented as described with reference to FIG. 1, can provide various symmetric encryption and decryption functionalities, such as by using one or more protocols and/or varying key sizes, like 128b, 192b, or 256b. In aspects, the AES unit 116 may include a crypto module 118 and/or PRNG 120, along with a secure PRNG reseeding module (not shown, e.g., FIG. 4), which may implement methods described herein. The component can select encryption or decryption of data that arrives in, e.g., 16-byte quantities to be encrypted or decrypted using different block cipher modes of operation. The AES unit 116 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the cryptographic engine via register writes. Alternatively, private channels for the transfer of key and data material may be included to reduce exposure from potentially untrusted processor activity.

The HMAC engine 210 may utilize, for instance, a secure hash algorithm (SHA) SHA-256 as a hashing algorithm. SHA-256 is a member of the SHA-2 family of hashing algorithms in which the digest (or hash output) is of 256b length, regardless of the data size of the input to be hashed. The data is sent into the HMAC engine 210 after declaring the beginning of a hash request. This zeroes out the internal state to initial conditions, e.g., 32b at a time. Once the data has been sent by a component client, the client can indicate the completion of the hash request (with optional partial-word final write). In accordance with an example portability interface scheme, the HMAC engine 210 produces the hash result and makes it available for register read by the requesting client. The data transfer may be made processor-available or may be made private to reduce exposure to potentially untrusted processor activity.

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (via SHA-256) of the message. To provide this functionality, a 256b key may be programmed into the circuit component before the message hash begins. The timing of authentication completion can vary and may be longer in latency than using native SHA-256. Here again, the hashing information or the secret key may be made processor-available for convenience or processing efficiency or may be rendered private in some manner for increased security.

The alert handler 208 is responsible for processing and responding to alerts, including ones provided from other components 114. The alerts can be considered security-sensitive interrupts that are to be handled in a timely manner to respond to a perceived security threat. Unlike "standard" interrupts, alerts may not be handled solely by software executing on the processor 106. Alerts can trigger a first-stage request to be handled by software as a "regular" interrupt. If, however, the software is not able to respond and properly remedy the alert-triggered interrupt, then the alert handler 208 triggers a second-stage response. The second-stage response can include enacting a security countermeasure, including terminating a process, erasing or otherwise deleting data, withdrawing power from a circuit portion, or resetting an IC chip or portion thereof. This ensures that the underlying issue—the perceived security threat—is addressed even if the processor 106 is busy, wedged, or also under attack.

Thus, an alert can be implemented as an elevated interrupt-type signal or alert indication that the alert handler 208 receives from other circuit components and that is indicative of a potential security threat. In operation, the alert handler 208 can gather alerts from other circuit components 114 of the security circuitry 112 and convert them into interrupts that the processor 106 can address. If the processor 106 does not clear the interrupt, however, the alert handler 208 provides hardware responses to address the potential security threat.

The security circuitry 112 can also include the RNG 222. Generally, randomness can contribute to the security functionality by providing variations in execution that can keep attackers from predicting a good time to launch an attack. A random number, for instance, can provide secret material used for identity and cryptographic purposes. The RNG 222 can be seeded into algorithmic computation to obscure sensitive data values. In aspects, the RNG 222 can be utilized in the entropy generation process to reseed the PRNG. Generally, the RNG 222 provides better performance as its number generation increasingly becomes truly random and to the extent it can also be hardened against attack. In some cryptographic processes, strong randomness guarantees may not be required. The RNG 222 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting circuit components or software can read from this pool to the extent bits are available. Attempted reading of entropy bits that are not available can trigger an interrupt or an alert.

Two other components 114 include the timer 224 and a flash controller (not shown), the latter of which is described in the following paragraph. The timer 224 can, for example, support accurate performance by the processor 106. The timer 224 is formed from multiple bits (e.g., 64 bits) and operates as a free-running timer with a guaranteed frequency to within some percentage. The timer 224 may enable the circuit components 114 to determine appropriate time intervals to perform operations. For example, a PRNG within the AES unit 116 may request reseeding in accordance with the timer 224. Another timer (not explicitly shown) can act as a watchdog timer to backstop the processor 106 in case the processor becomes unresponsive. The unresponsiveness may be due to development code that is wedged, a security attack, and so forth.

Although not shown, a flash controller may control the flash memory 206, which is available for code and data storage. The primary read path for this data can be in the standard memory address space. Writes to that address space can be ignored, however, because flash is not written to in a standard way. Instead, to write to the flash memory 206, software interacts with the flash controller. The flash functionality can include three primary commands: read, erase, and program. Read commands can be standardized and can use the chip memory address space. Erase commands are performed at a page level, where the page size is param- eterizable by the flash controller. Upon receiving an erase request, the flash controller wipes the contents of the target page, which renders the data into a "1" state (e.g., 0xFFFFFFFF per word). Afterward, software can program individual words to any value. A flash bit is not returned to a "1" state without another erase, so future content is effectively changed with an AND of the current content and the written value. Erase and program commands are rela- tively slow. A typical erase time is measured in milliseconds, and program times are in the range of microseconds. Secu- rity is also a concern because secret data may be stored in the flash memory 206. Some memory protection can therefore be provided by the flash controller.

The security circuitry 112 is depicted in FIG. 2 with a particular set of circuit components. A given security cir- cuitry 112 can, however, have more, fewer, or different circuit components. The circuit components may also be interconnected differently or operate in manners besides those example manners described herein. Further, some circuit components may be omitted while other circuit components are implemented in multiple instances. For example, the alert handler 208 may be duplicated or distrib- uted, or multiple AES units 116 may be present in some security circuitry 112. Further, a GPIO interface 216 may be omitted from among the components 114 of security cir- cuitry 112 for IC chips in which the security circuitry 112 forms but one core among dozens.

In aspects, any of the circuit components 114 may include a cryptographic processor 230 that executes the crypto- graphic operations of the component. In some implementa- tions, the cryptographic processor 230 is separate from the processor 106 of FIG. 1. In other implementations, the cryptographic processor 230 is implemented within the processors 106. Further, any of the circuit components 114 may include a cryptographic processor 230 (or processing core) to perform the specific functions of that component.

Figures 1, 5:
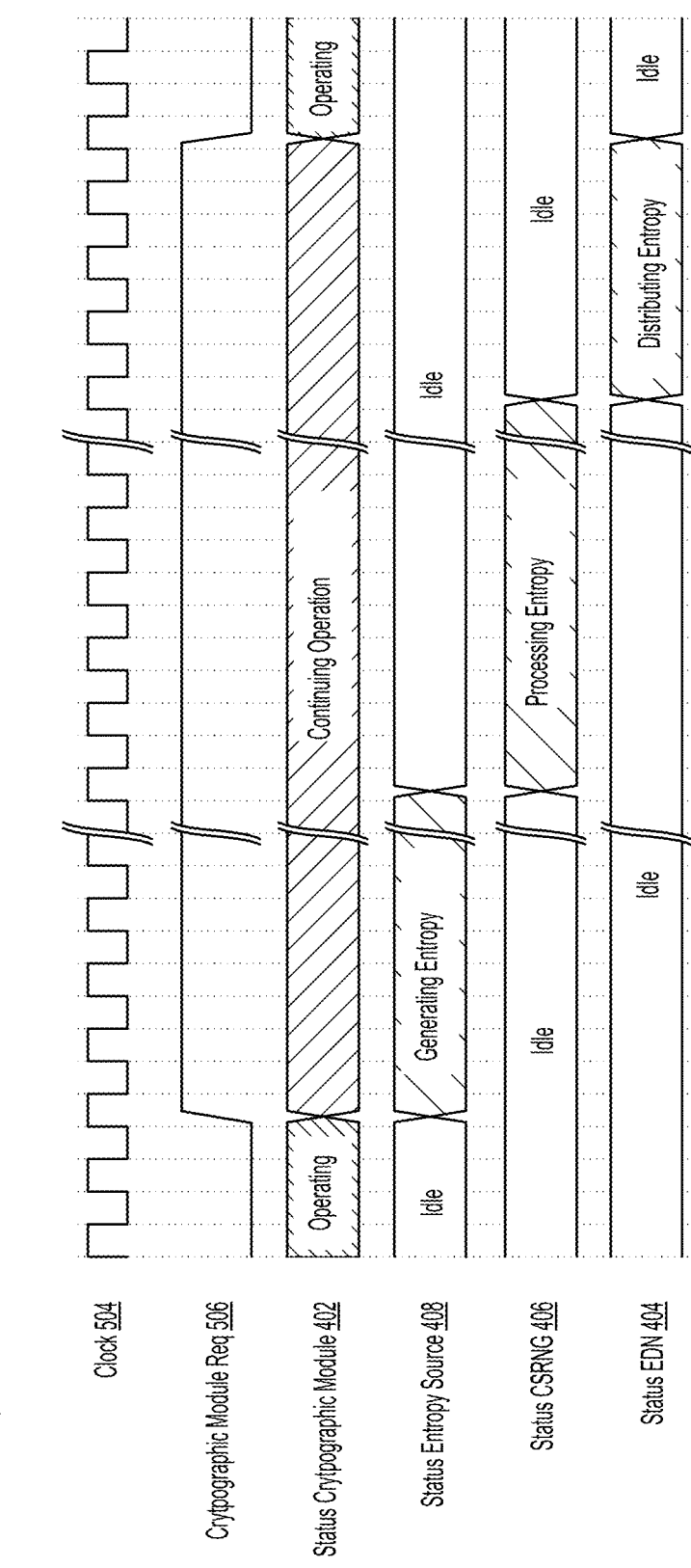
Figures 2, 5:
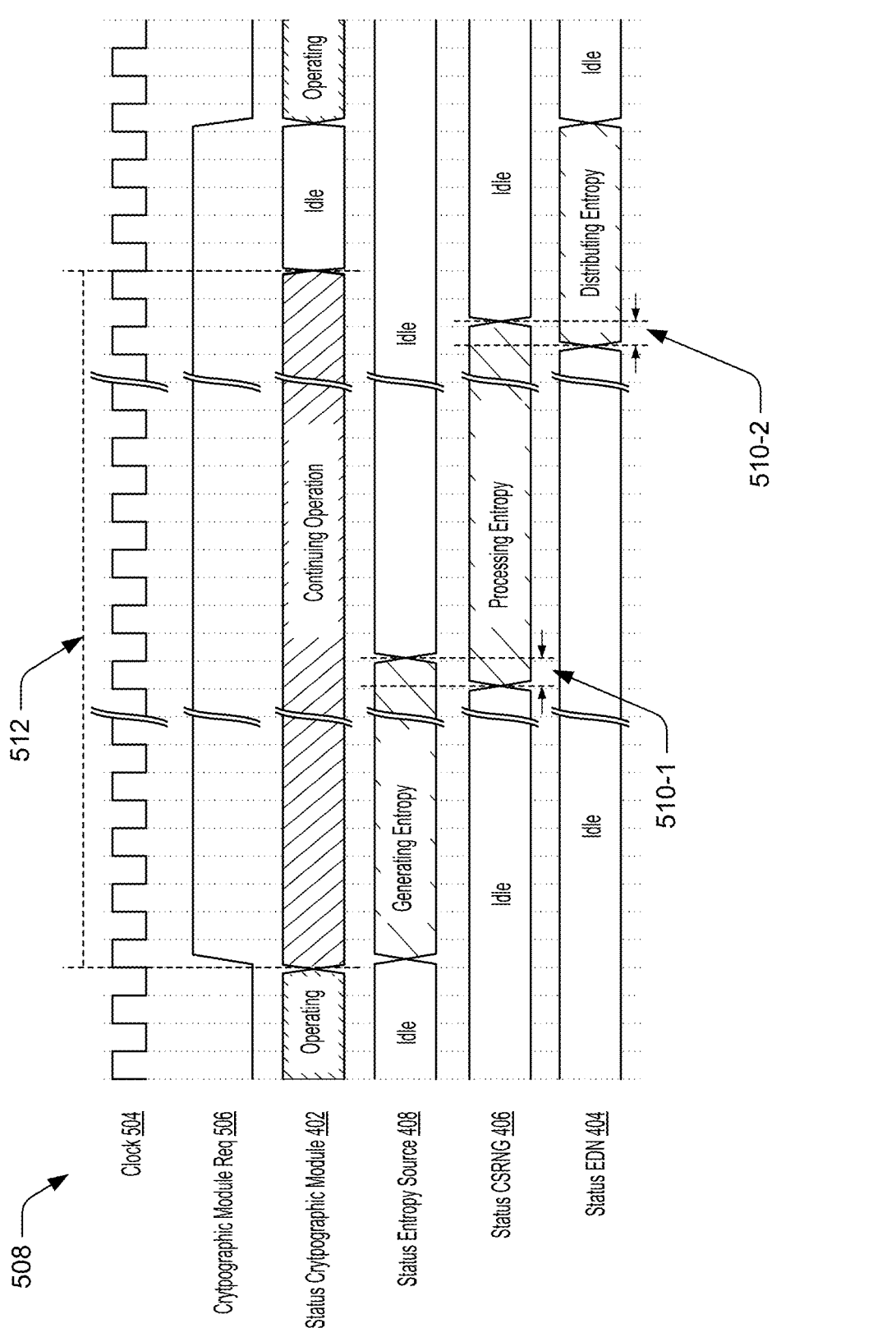
Figures 3, 5:
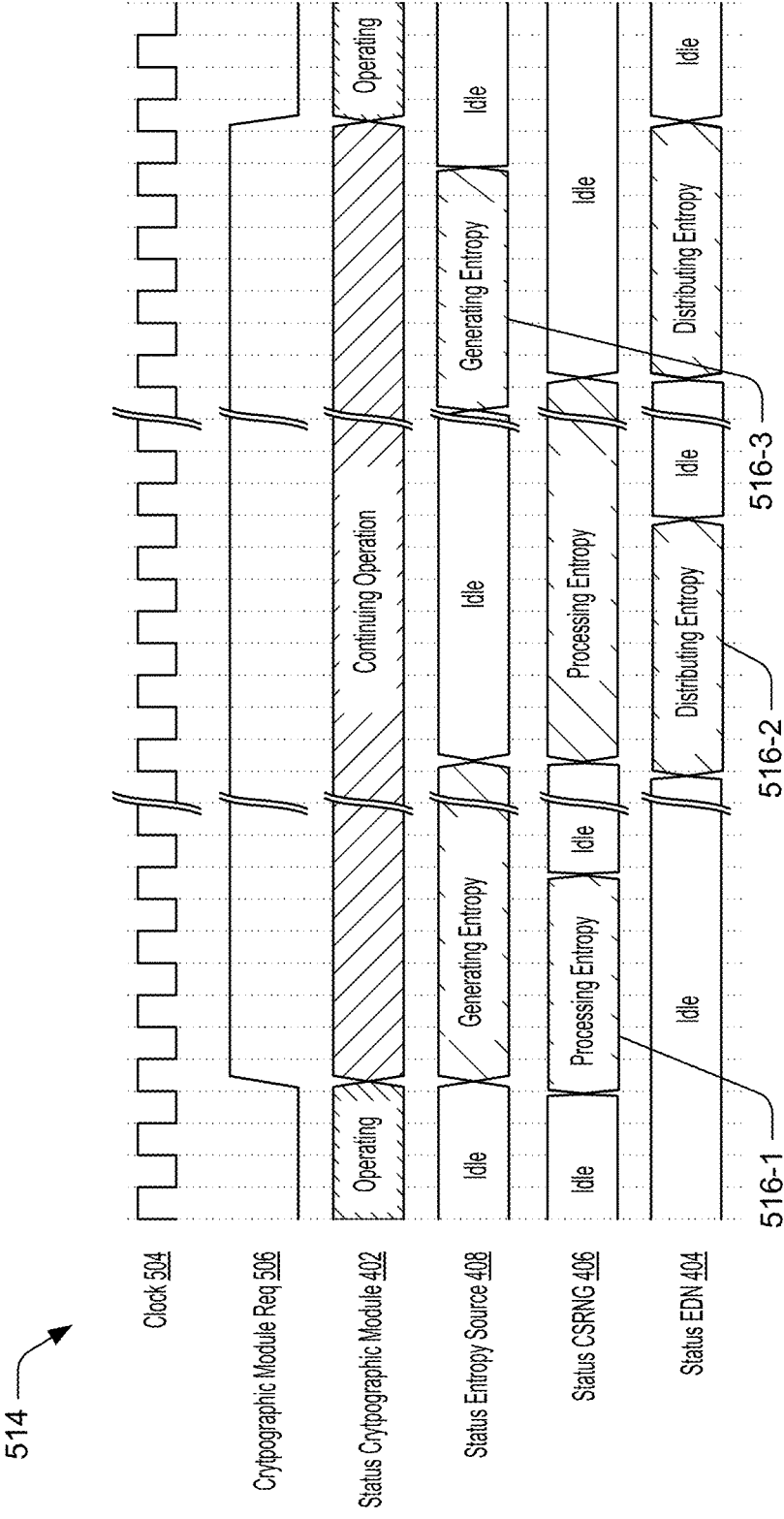

FIG. 3 illustrates an example AES unit 116 that can implement secure PRNG reseeding in accordance with one or more aspects. The AES unit 116 can provide symmetric encryption and decryption using one or more protocols and varying key sizes, like 128b, 192b, or 256b. The component can select encryption or decryption of data that arrives in, e.g., 16-byte quantities to be encrypted or decrypted using different block cipher modes of operation.

In aspects, the AES unit 116 includes a PRNG 120 that generates pseudo-randomness to determine a mask. The mask is mixed with the input data using Boolean masking to create the masked data. The masked data may be multi- plexed and stored in a state register 302. The input data may then undergo non-linear operations within the masked Sub- Bytes 304. The masked SubBytes 304 may include any number of substitution boxes or Galois-Field (GF) multipliers. During the SubBytes 304 process, a byte of the input data may be substituted and shifted to produce a crypto- graphically secure method to reduce the correlation between the input bits and the output bits. In aspects, the data may be remasked at the SubBytes 304.

The masked data may then pass through a ShiftRows 306 stage where the rows of the masked data are shifted during the forward process. Within the ShiftRows 306 stage, the rows of the masked data (e.g., state array) may be circularly shifted to scramble the byte order of the input data. The masked data may then be passed through a MixColumn 308-1 stage where each byte in a column is replaced by a function of all of the bytes in the same column.

The AES unit 116 can provide symmetric encryption and decryption and thus, the full key data may be encrypted using the initial key or encrypted using a decryption key 310. During encryption or decryption, the respective key may be masked and operated on by a number of substitution boxes and GF multipliers at the Masked KeyExpand 312 stage. The respective key may be operated on at a MixCol- umn 308-2 stage and mixed with the masked data to enable encryption or decryption. The output may be fed back through the state register 302, and the process may be performed iteratively until all stages of the encryption or decryption process are complete. In aspects, the AES unit 116 may include a secure PRNG reseeding module 314, which may manage or coordinate operations of components of the AES unit 116, entropy complexes, cryptographic modules, and/or other entities described herein to implement aspects of secure PRNG reseeding. Alternatively or addi- tionally, the secure PRNG reseeding module 314 may be implemented (e.g., as hardware and/or software) with or as part of other components described, such as entropy circuits or cryptographic modules.

Example Entropy Generation for Secure PRNG Reseeding

Figure 4:
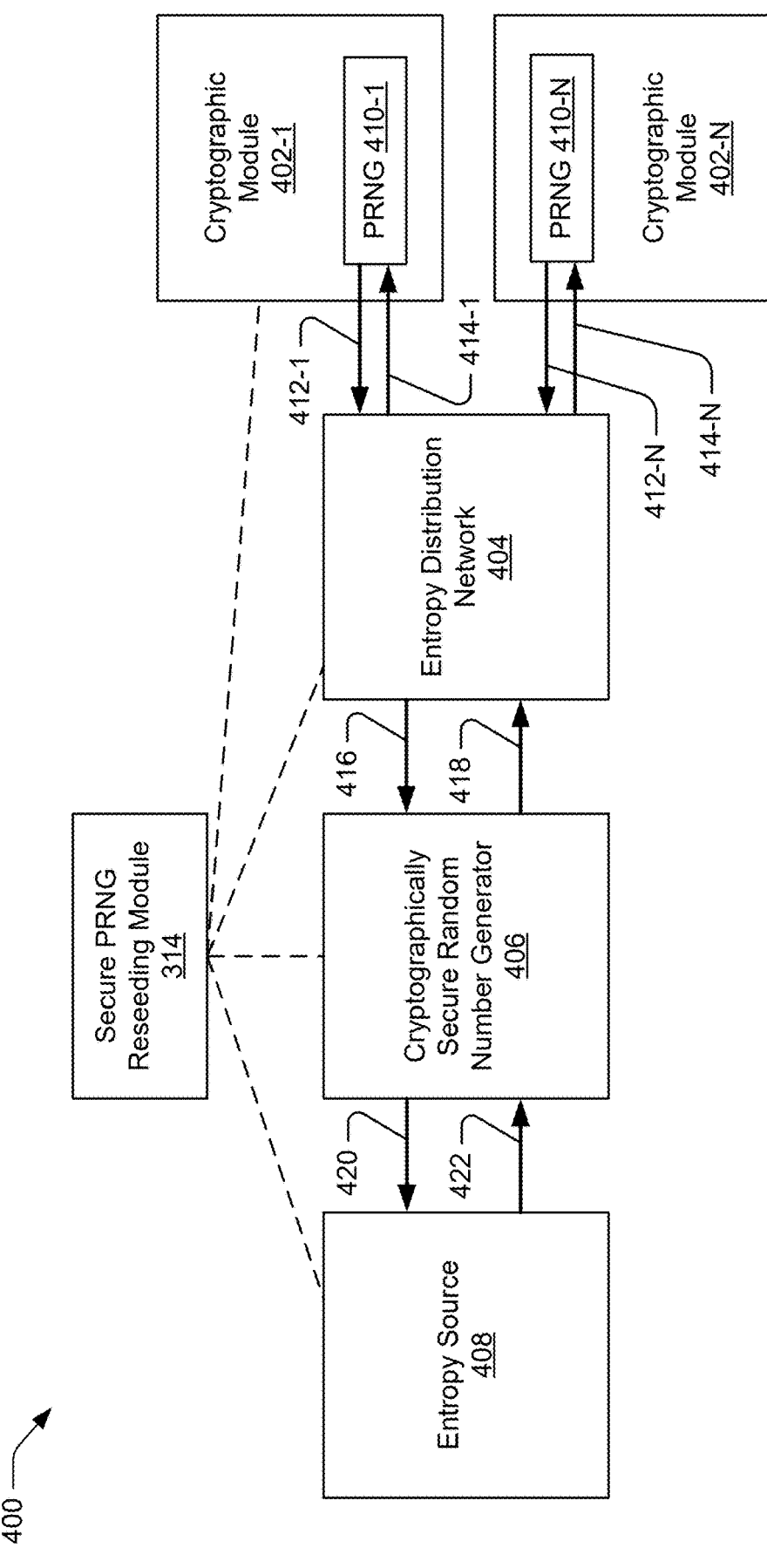
FIG. 4 illustrates an example of entropy generation in accordance with one or more aspects of secure PRNG reseeding.

FIG. 4 illustrates at 400 an example of entropy generation in accordance with one or more aspects of secure PRNG reseeding. The illustrated entropy generation may be imple- mented within the security circuitry 112 to supply entropy to one or more PRNGs 410 (e.g., PRNG 120 of FIG. 1) of the cryptographic modules 402 (e.g., cryptographic module 118 of FIG. 1). As illustrated, the cryptographic modules 402 are PRNG-dependent because entropy is supplied to PRNG 410-1 through PRNG 410-N, and the PRNGs 410 pseudo- randomness for performing cryptographic operations of cryptographic module 402-1 through cryptographic module 402-N, respectively. In aspects, the entropy generation cir- cuit may include or be associated with a secure PRNG reseeding module 314, which may interact with various components and modules described herein to implement one or more aspects of secure PRNG reseeding.

In aspects, the PRNGs 410 provide pseudo-randomness because the randomness is not produced with cryptographic guarantees that the values are uniformly distributed and untraceable. For masking and remasking purposes, these guarantees may not be required, and thus PRNGs 410 may be used to efficiently provide randomness for these crypto- graphic operations. However, masking and remasking operations may require high-bandwidth entropy generation that can support masking operations at every clock cycle. In this way, the entropy generation circuit may be required to support multiple bits of entropy generation every clock cycle (e.g., hundreds of bits of randomness per clock cycle).

The entropy generation circuit may be restricted by circuit area constraints because a large number of entropy generation circuits may be used in a single integrated circuit. It may be important to simplify the design of the entropy generation circuit to a lower circuit area by loosening the constraints that ensure backward secrecy and uniformity that may not be required for masking and remasking operations. In this way, the circuit cost may be reduced due to the decrease in circuit area.

To satisfy these requirements, any number of PRNG implementations may be used. In one example, a PRNG may be defined that utilizes linear feedback shift registers. For example, a value may be input from a feedback source (e.g., movement on a mouse, radiation, or any other available feedback) and mixed with the current value through logic gates to produce pseudo-randomness. In other examples, a multiplier may be used to multiply random data with the value to produce pseudo-randomness. It should be appreciated that any number of PRNG implementations may be applied without extending beyond the scope of this document.

In general, PRNGs 410 may be reseeded at various times to provide an initial value to produce randomness from the updated seed. By periodically reseeding the initial value, operations to produce pseudo-randomness may produce better statistical behavior over a period of time. Without reseeding the PRNGs 410, the randomness produced by the PRNGs 410 may become deterministic, therefore an entropy generation framework may be necessary to provide fresh randomness to reseed the PRNGs 410.

In aspects, PRNGs 410 provide pseudo-randomness to the cryptographic modules 402 using a current seed provided to the PRNGs 410. At any time, the cryptographic modules 402 may determine that reseeding is needed and request entropy from an entropy distribution network 404. The cryptographic modules 402 or the PRNGs 410 may determine that entropy is needed for reseeding and assert the requests 412 (e.g., request 412-1 or request 412-N) in any number of appropriate methods. For example, the cryptographic modules 402 may maintain a counter that enables the cryptographic modules 402 to request 412 reseeding if the PRNGs 410 have operated using a current seed across a certain number of clock cycles. In other implementations, the cryptographic modules 402 may determine the quality of the entropy being consumed by the cryptographic modules 402 and request 412 reseeding when the quality falls below a desired quality.

The entropy distribution network 404 may interface to multiple cryptographic modules 402. When any of the PRNGs 410 request 412 entropy from the entropy distribution network 404, the entropy distribution network 404 may determine if entropy 414 is available to provide to the PRNGs 410. If entropy is available, the entropy distribution network 404 may provide the entropy 414 (e.g., entropy 404-1 or entropy 404-N) to the one or more PRNGs 410 that request 412 reseeding. In some implementations, entropy 414 may be provided to each of the PRNGs 410. If entropy 414 is not available, however, the entropy distribution network 404 may request 416 entropy 418 from a cryptographically secure random number generator 406.

The cryptographically secure random number generator 406 may include an AES engine that enables the entropy 422 provided by an entropy source 408 to be scaled in a cryptographically safe manner. When a request 416 for entropy 418 is made from the entropy distribution network 404 to the cryptographically secure random number generator 406, the cryptographically secure random number generator 406 may determine that entropy 418 is available and provide the entropy 418 to the distribution network 404. If it is decided that entropy 418 is not available at the cryptographically secure random number generator 406, a request 420 may be made to the entropy source 408.

The entropy source 408 may produce high-quality entropy 422 at a low bandwidth. As non-limiting examples, the entropy source 408 may produce around two bits of entropy 422 per clock cycle, two bits of entropy 422 per ten clock cycles, or two bits of entropy 422 per hundred clock cycles. In aspects, the entropy source 408 produces entropy 422 by measuring and combining different measurement sources (e.g., cosmic radiation or the movement (e.g. by a human operator) of a mouse within a timeframe). The measurement sources may be independent and may make measurements of respective phenomena which are statistically uncorrelated with each other. The entropy source 408 may then pass the values through a circuit that shapes the values and performs quality checks (e.g., for uniformity and reverse secrecy), to generate the entropy 422. Once the entropy 422 is generated, it may be provided by the entropy source 408 to the cryptographically secure random number generator 406.

At the cryptographically secure random number generator 406, the entropy 422 may be whitened further, and the bandwidth may be increased to produce a greater number of bits of entropy 418 at each clock cycle. For example, two bits of entropy 422 may be produced by the entropy source 408 per hundred clock cycles, and the cryptographically secure random number generator 406 may produce two bits of entropy 418 every clock cycle or every ten clock cycles. The entropy 418 produced by the cryptographically secure random number generator 406 may then be provided to the entropy distribution network 404 that provides the entropy 414 to the PRNGs 410 as a seed to enable the PRNGs 410 to provide high-bandwidth entropy usable for masking and remasking operations in the cryptographic modules 402.

It should be noted that the entropy generation process may be a relatively long and expensive operation. For example, it may take more than one hundred clock cycles for entropy to reach the PRNGs 410 from the entropy source 408. Moreover, each of the entropy source 408, the cryptographically secure random number generator 406, and the entropy distribution network 404 may create a strong power signature during operation. The entropy distribution network 404 may span across large parts of the integrated circuit to provide entropy to different circuit components. Thus, the entropy distribution network 404 may contain strong drivers and transistors that produce a large power signature. Similarly, the cryptographically secure random number generator 406 may utilize an AES cipher within the module that requires multiple transistors to perform operations. The entropy source 408 may also include cryptographic modules that create large power signatures during operation. In this way, it may be possible to determine the isolated operation of these modules by observing the power signature of the integrated circuit.

In typical operation of cryptographic module 402, cryptographic operations may be terminated when a request 412 is made to reseed the PRNGs 410. However, terminating operation of the cryptographic module 402 may isolate critical power signatures of the IC that may characterize secret keys and other cryptographic information. In some implementations, the power signatures of the entropy source 408, the cryptographically secure random number generator 406, or the entropy distribution network 404 may indicate that an old cycle of cryptographic processes have terminated and a new cycle of cryptographic operations are about to begin. In this way, an attacker may be able to observe changes in the power signature as a result of the large number of transistors within the cryptographic modules switching to a deactivated state.

With respect to security hardening, visible observation of the activation and deactivation of the cryptographic module 402 may provide security-sensitive information to attackers that allows for better-tuned attacks. Specifically, cryptographic modules 402 may maintain cryptographically secure keys that are used to perform certain cryptographic operations. By knowing when the cryptographic keys will be used in operations, an attacker may be able to observe characteristics associated with operation of the integrated circuit to extract the cryptographic key or bypass security measures. If the cyclical operation of the cryptographic modules 402 is known by an attacker, attacks may be directed to extract the cryptographic key or bypass security measures at each cycle of operation of the cryptographic modules 402. Therefore, typical entropy generation processes may aggravate cryptographic attacks on the integrated circuit.

To reduce the ability to determine details about integrated circuit operation, the cryptographic module 402 and other modules (e.g., the entropy source 408, the cryptographically secure random number generator 406, and the entropy distribution network 404) may be controlled during entropy generation. Various examples of controlling the cryptographic modules 402, the entropy source 408, the cryptographically secure random number generator 406, and the entropy distribution network 404 are described with respect to FIGS. 5-1 through 5-3.

FIG. 5-1 illustrates an example timing diagram 502 for secure PRNG reseeding in accordance with one or more aspects. In the timing diagram 502, a cyclical clock 504 is illustrated. A cryptographic module request 506, which may be an example of the request 412, is asserted to indicate that a PRNG associated with the cryptographic module 402 has requested reseeding. The timing diagram 502 illustrates the operation of the cryptographic module 402, the entropy source 408, the cryptographically secure random number generator 406, and the entropy distribution network 404.

Initially, the cryptographic module 402 is illustrated as operating before the cryptographic module request 506 is asserted. When the cryptographic module request 506 is asserted and it is determined that entropy generation is needed, the cryptographic module 402 may continue operation during entropy generation. The cryptographic module 402 may be signaled to perform operations during entropy generation in any number of ways. In some implementations, the cryptographic module request 506 may signal the initiation or termination of entropy generation. For example, entropy generation may begin when the cryptographic module request is asserted, and entropy generation may terminate when the cryptographic module request 506 is deasserted. In aspects, the cryptographic module may activate a timer that tracks the number of clock cycles since the cryptographic module request 506 was asserted. Operation of the cryptographic module to produce a power signature that is not indicative of deactivation of the cryptographic module may continue until a predetermined time value is reached or until the cryptographic module request 506 is deasserted, indicating that the PRNG has been reseeded. As such, the cryptographic module may not operate indefinitely or after the quality of the randomness provided by the PRNG degrades beyond an acceptable level.

In other implementations, signaling may be received by the cryptographic module 402 to indicate that entropy generation is occurring. For example, the cryptographic module

402 may receive signaling indicative of the generation of entropy from any of the modules utilized during the entropy generation process. The cryptographic module 402 may continue operation to produce a power signature that is not indicative of deactivation of the cryptographic module 402 as long as the signal is received.

In aspects, the cryptographic module 402 may continue performing cryptographic operations (e.g., masking and remasking) using entropy generated based on a current seed value provided to the PRNG. It may be possible to continue performing these cryptographic operations because entropy for masking and remasking operations may not be required to conform to the same guarantees (e.g., uniformity and reverse secrecy) as other cryptographic operations. In this way, the cryptographic module 402 may continue to perform operations while entropy is being generated.

Specifically, the cryptographic module 402 may continue to operate during entropy generation by the entropy source 408, during entropy processing by the cryptographically secure random number generator 406 to produce additional bits of entropy, and/or during entropy distribution on the bits of entropy by the entropy distribution network 404. Entropy generation is described in detail with respect to FIG. 3. In aspects, operation of the cryptographic module 402 during entropy generation may limit the ability of an attacker to determine the operation of the cryptographic module 402 from the power signature or any other channel. For example, maintaining operation of the cryptographic module 402 may allow for the noise floor of the power signature to increase, thereby making it more difficult to distinguish individual differences in the power signature that may provide information about the operations of the integrated circuit. By operating the cryptographic module 402 in a way that produces a power signature that is not indicative of deactivating the cryptographic module 402, the power signature or other channel signatures of the integrated circuit may not include large changes that indicate the initiation and termination of the cryptographic module 402. Additionally, the cryptographic module 402 may operate more efficiently without having to terminate operations during entropy generation.

In other implementations, the cryptographic module 402 may be operated without performing cryptographic operation during entropy generation. For example, the cryptographic module request 506 may be asserted to indicate that entropy is requested for reseeding the PRNG. The cryptographic module 402 may begin performing operations that do not include cryptographic operations and produce a power signature that is not indicative of deactivation of the cryptographic module 402. In doing so, the power signature of the integrated circuit may not indicate the initiation or termination of the cryptographic module 402. Additionally, by continuing operation of the cryptographic module 402 without performing cryptographic operations it may be ensured that masking and remasking operations are never performed with entropy below a particular quality, thus increasing security hardening.

In either implementation, the cryptographic module 402 may operate to produce a power signature that is not indicative of deactivation of the cryptographic module 402. Once the entropy is distributed by the entropy distribution network 404, the cryptographic module request 506 may be deasserted, the PRNGs may be reseeded using the fresh entropy, and the cryptographic module 402 may continue cryptographic operations using the new seed provided by the fresh entropy.

It should also be noted that the entropy generation process may not involve all of the steps illustrated. For example, the cryptographic module request 506 may be asserted and it may be determined that entropy is available at the entropy distribution network 404. In this case, the entropy may be distributed by the entropy distribution network 404 and a request may not be sent to the cryptographically secure random number generator 406. As such, the cryptographic module 402 may operate during any entropy generation process.

In some implementations, the cryptographic module 402 may be configured to consume an amount of entropy less than the amount of entropy requested. For example, the cryptographic module 402 may request eight bits of entropy from the entropy distribution network 404. The entropy distribution network 404 may determine that only four bits of entry are available to be consumed and provide the four bits of entropy to the cryptographic module 402 for reseeding the PRNG. The cryptographic module 402 may perform cryptographic operations based on the entropy provided by the PRNG using the lesser amount of entropy provided to the PRNG. In this way, the cryptographic module 402 may be able to continue operation and perform cryptographic operations using any amount of fresh entropy available.

In addition to providing the entropy to the PRNG for reseeding, the entropy distribution network 404 may request more entropy from the cryptographically secure random number generator 406. If entropy is available, the entropy may be provided to the cryptographic module 402. If entropy is not available, the cryptographically secure random number generator may request entropy from the entropy source 408. In this way, the cryptographic module 402 may be provided all available entropy, and entropy generation may be initiated to produce entropy for later use.

FIG. 5-2 illustrates an example timing diagram 508 for secure PRNG reseeding in accordance with one or more aspects. Similar to FIG. 5-1, timing diagram 508 illustrates a cyclical clock 504, a cryptographic module request 506 is asserted to indicate that a PRNG associated with the cryptographic module 402 has requested reseeding, and the cryptographic module 402 operates during entropy generation. As described with respect to FIG. 4, the entropy generation process includes the entropy source 408 generating entropy 422, the cryptographically secure random number generator 406 processing the generated entropy to produce additional bits of entropy 418, and the entropy distribution network 404 distributing the additional bits of entropy 414 to the PRNGs 410. In the timing diagram 508, however, further control of the entropy generation process is used to disguise the operations of the integrated circuit within the power signature.

Unlike in FIG. 5-1, the entropy source 408, cryptographically secure random number generator 406, and the entropy distribution network 404 do not operate within respective time intervals. Instead, the entropy source 408 overlaps with operation of the cryptographically secure random number generator 406 at overlap 510-1, which overlaps operation of the entropy distribution network 404 at overlap 510-2. In aspects, the entropy source 408, cryptographically secure random number generator 406, or the entropy distribution network 404 may perform operations before an input is provided to the module or after the entropy is output from the module. For example, any of the modules may perform operations on insignificant values that produce a power signature similar to normal operation of the modules. At the end of the operations, the values may be discarded without consequence.

Any of the modules during the entropy generation processes may be operated during a same time interval. For example, two or more of generating the bits of entropy, processing the entropy, or distributing the bits of entropy may occur at least in part during a same time interval. By overlapping the power signature of the entropy source 408, the cryptographically secure random number generator 406, or the entropy distribution network 404, the overall power signature of the integrated circuit may be disguised to hide the transitions within the entropy generation process. In doing so, the attacker may be unable to determine useful information about the execution of the integrated circuit, thereby limiting the ability to strengthen future attacks based on the circuit operations.

Also shown in the example timing diagram 508, the cryptographic module 402 terminates operation during the entropy generation process (i.e. prior to the entropy distribution network 404 completing the transmission of the entropy to the cryptographic module 402) responsive to operating for a predetermined number of clock 504 cycles. For example, the cryptographic module 402 may operate for the predetermined time period 512. As shown, the cryptographic module 402 terminates operation before the entropy generation process terminates and the cryptographic module request 506 is deasserted. In this example implementation, the cryptographic module 402 may utilize a timer to track clock cycles and ensure that the cryptographic module does not continue operating indefinitely in the case of an error during the entropy generation process.

FIG. 5-3 illustrates an example timing diagram for secure PRNG reseeding in accordance with one or more aspects. Similar to FIGS. 5-1 and 5-2, timing diagram 514 illustrates a cyclical clock 504. A cryptographic module request 506 is asserted to indicate that a PRNG associated with the cryptographic module 402 has requested reseeding, and the cryptographic module 402 operates during entropy generation to overlap at least a portion of power consumption associated with the generating of the entropy for reseeding the PRNG-dependent cryptographic module 402. The entropy generation process illustrated includes the entropy source 408 generating entropy, the cryptographically secure random number generator 406 processing the generated entropy to produce additional bits of entropy, and the entropy distribution network 404 distributing the additional bits of entropy.

Like in FIG. 5-2, further control of the entropy generation process is used to disguise the operations of the integrated circuit within the power signature. In the timing diagram 514, however, the entropy source 408, the cryptographically secure random number generator 406, and the entropy distribution network 404 operate randomly or pseudo-randomly in addition to their normal operation during entropy generation. For example, any of the modules used to generate entropy may perform operations 516 (e.g., operation 516-1, operation 516-2, or operation 516-3) which do not contribute to the entropy generation but which are similar to those performed by the module during entropy generation. In this way, any of the modules may operate during a same time interval to produce an overall power signature that disguises the operations of the integrated circuit by overlapping the power signatures from the modules used in entropy generation.

The entropy source 408, the cryptographically secure random number generator 406, or the entropy distribution network 404 may operate randomly or pseudo-randomly during the entropy generation process to increase the noise floor of the integrated circuit and limit noticeable differences in the operation of the integrated circuit based on the power signature. In some implementations, the entropy source 408, the cryptographically secure random number generator 406, or the entropy distribution network 404 may operate randomly outside of the entropy generation process, for example, when the cryptographic module request 506 is deasserted, to further disguise the operations of the integrated circuit based on the power signature.

Like in FIG. 5-2, the entropy source 408, the cryptographically secure random number generator 406, or the entropy distribution network 404 each at different times perform normal entropy generation operations and perform operations inconsequentially (that is, actions which do not contribute to the entropy generation or distribution). For example, one or more of the modules may perform entropy generation may be used for reseeding the PRNGs when requested, while other of the modules perform inconsequential "random" operations, e.g. operations on placeholder values, the results of which are discarded.

In any implementation described, operating the cryptographic module 402 during entropy generation may inhibit the ability to determine meaningful differences in the operation of the integrated circuit based on the power signature.

Example Methods

Methods 600 and 700 are illustrated as a set of blocks that specify operations that may be performed but are not necessarily limited to the order or combinations shown for performing the operations by the respective blocks. Further, any of one or more of the operations may be repeated, combined, reorganized, or linked to provide a wide array of additional and/or alternate methods. The techniques are not limited to performance by one entity or multiple entities operating on one device. In some aspects, operations or acts of the methods 600 are implemented by or managed by a secure PRNG reseeding module 314, an entropy complex, and/or cryptography module. For clarity, the methods are described with reference to the elements of FIG. 1 and/or entities, components, or configurations described with reference to FIGS. 1-5.

FIG. 6 illustrates an example method 600 for secure PRNG reseeding in accordance with one or more aspects. At 602, a request for entropy for reseeding a PRNG-dependent cryptographic module 118 is received by an entropy generation circuit. In aspects, the request for entropy for reseeding a PRNG-dependent cryptographic module 118 is asserted by the PRNG 120 or the PRNG-dependent cryptographic module 118. In some implementations, requesting entropy for reseeding is responsive to determining that the current entropy consumed by the cryptographic module 118 is below a desired quality (defined according to a quality criterion, such as a measure of the predictability of the current entropy). As such, the cryptographic module 118 may ensure that cryptographic processes utilize pseudo-randomness that meets certain quality assurances. In aspects, entropy is requested for reseeding the PRNG-dependent cryptographic module 118 in response to completion of a timer. In this way, it may be ensured that the PRNG 120 of the cryptographic module 118 is reseeded at certain time intervals.

At 604, entropy for reseeding the PRNG-dependent cryptographic module 118 is generated with a random number generator based on an entropy source. In aspects, the entropy generation may be performed in three operations: entropy generation, entropy processing, and entropy distribution. High-quality entropy may be generated by an entropy source and processed at a cryptographically secure random number generator by performing quality checks and increasing the bandwidth of the entropy generation. The cryptographically secure random number generator may create a greater number of bits of entropy than produced by the entropy source, and the greater number of bits of entropy may be provided to the entropy distribution network. The entropy distribution network may distribute the greater number of bits of entropy to one or more cryptographic modules 118 for reseeding the PRNGs 120.

In some implementations, the entropy generation, the entropy processing, or the entropy distribution may occur during a same time as another of the entropy generation, the entropy processing, or the entropy distribution. In this way, the power signature of the integrated circuit may not be indicative of the individual processes within entropy generation, and the overall noise floor of the power signature may be increased. In aspects, entropy generation may be implemented by randomly operating the entropy source, the cryptographically secure random number generator, or the entropy distribution network (i.e. causing those modules to perform operations which do contribute to entropy generation or distribution) to further conceal the processes occurring within entropy generation.

At 606, the PRNG-dependent cryptographic module 118 is operated during entropy generation to overlap at least a portion of respective power consumption of operating the PRNG-dependent cryptographic module with that of generating the entropy for reseeding the PRNG-dependent cryptographic module 118. For example, the PRNG-dependent cryptographic module 118 may produce a power signature that masks the power signature generated by the entropy generation process to obscure operation of the random number generator during entropy generation. Alternatively or additionally, the power signature generated by the random number generator or other entropy components masks the power signature of the PRNG-dependent cryptographic module 118 to obscure operation of the PRNG-dependent cryptographic module 118. In aspects, the PRNG-dependent cryptographic module 118 performs masking and remasking operations using pseudo-randomness provided by a PRNG 120. For masking and remasking operations, quality assurances that may be necessary for other cryptographic operations may not be required. Thus, the PRNG-dependent cryptographic module 118 may continue performing masking and remasking operations using a current seed value, even when a new seed is requested. For example, the PRNG-dependent cryptographic module 118 may continue performing operations during entropy generation using the pseudo-randomness provided by the PRNG 120 based on the current seed. In this way, attackers may be unable to determine important characteristics about the operation of the integrated circuit based on deactivation of the cryptographic module during entropy generation.

In some implementations, it may be desirable to ensure that cryptographic operations are not performed using entropy that is below a desired quality. As such, the PRNG-dependent cryptographic module 118 may continue performing operations to produce a power signature that overlaps at least a portion of power consumption associated with generating the entropy of the PRNG-dependent cryptographic module 118 without performing cryptographic operations with the PRNG-dependent cryptographic module 118. For example, the cryptographic module 118 may continue to perform operations on data of similar size and complexity to the data used in cryptographic operations, but the data may be discarded after completion of the operations.

In doing so, the cryptographic module 118 may continue to produce a power signature that is not indicative of deactivating the PRNG-dependent cryptographic module 118 without adverse effects to security hardening that may occur from a usage of low-quality entropy in cryptographic processes.

Operating the PRNG-dependent cryptographic module 118 may occur in coordination with any number of signaling mechanisms. For example, the cryptographic module 118 may receive signaling indicative of entropy generation during the entropy generation process, and the cryptographic module 118 may perform operations until the signaling indicative of entropy generation is no longer received. In other implementations, the cryptographic module 118 may maintain a timer that begins operation in response to sending a request for entropy to reseed the PRNG-dependent cryptographic module 118. In this implementation, the cryptographic module 118 may perform operation to produce a power signature that is not indicative of deactivation of the PRNG-dependent cryptographic module 118 until entropy for reseeding is received by the PRNG-dependent cryptographic module 118 or until the timer reaches a predetermined value.

At 608, entropy generated with the cryptographically secure random number generator is provided to the PRNG-dependent cryptographic module 118 to reseed the PRNG-dependent cryptographic module 118 for subsequent cryptographic operations. In aspects, the entropy may be distributed by an entropy distribution network to multiple PRNGs 120 within multiple PRNG-dependent cryptographic modules 118.

FIG. 7 illustrates an example method for continuing to operate a cryptographic module 118 while entropy is generated for reseeding the cryptographic module 118. At 702, a PRNG-dependent cryptographic module 118 is operated to enable cryptographic operations based on previously-received seed entropy. In aspects, the PRNG-dependent cryptographic module 118 may utilize entropy produced by a PRNG 120 based on the previously received seed entropy.

At 704, entropy for reseeding the PRNG-dependent cryptographic module 118 may be requested. In some implementations, requesting entropy for reseeding is responsive to determining that the current entropy consumed by the cryptographic module 118 is below a desired quality. In other implementations, entropy is requested for reseeding the PRNG-dependent cryptographic module 118 in response to completion of a timer. The one or more PRNGs 120 or cryptographic modules 118 may request entropy simultaneously or at different moments in time. In aspects, the request for entropy is received by the entropy distribution network, which determines whether entropy is available for distribution. If entropy is not available (or, more generally, if the amount of available entropy is below a threshold, such as the amount of entropy sufficient to satisfy the request for entropy), the entropy generation process may begin.

At 706, an entropy source is operated to generate entropy for reseeding the PRNG-dependent cryptographic module 118. The entropy source 408 may produce high-quality entropy 422 at a low bandwidth. In aspects, the entropy source 408 produces entropy 422 by measuring and combining different measurement sources (e.g., cosmic radiation or the movement of a mouse within a timeframe). The entropy source 408 may then pass the values through a circuit that shapes the values and performs quality checks (e.g., for uniformity and reverse secrecy). Once the entropy

422 is generated, it may be provided by the entropy source 408 to the cryptographically secure random number generator 406.

At 708, the PRNG-dependent cryptographic module 118 may continue to operate based on the previously received seed entropy during the entropy generation process that begins at 706. In contrast to typical cryptographic modules, the cryptographic module 118 may continue to operate to overlap at least a portion of power consumption associated with the generating of the entropy for reseeding the PRNG-dependent cryptographic module 118. In some implementations, generating the entropy with the random number generator produces a first power signature indicative of generating the entropy, and operating the PRNG-dependent cryptographic module 118 while generating the entropy generates a second power signature that at least partially overlaps the first power signature to obscure operation of the PRNG-dependent cryptographic module 118 or the operation of the random number generator to generate the entropy.

In aspects, operating the PRNG-dependent cryptographic module 118 generates a power signature that is not indicative of deactivating the PRNG-dependent cryptographic module 118 without performing cryptographic operations with the PRNG-dependent cryptographic module. Alternatively, operating the PRNG-dependent cryptographic module 118 generates a power signature that is not indicative of deactivating the PRNG cryptographic module 118 by performing cryptographic operations with the PRNG-dependent cryptographic module 118 using a current seed.

Optionally, at 710 the cryptographic module 118 may be reseeded using partially generated entropy. In aspects, the cryptographic module 118 may be configured to consume an amount of entropy less than the amount of entropy requested. For example, the cryptographic module 118 may receive less entropy than requested because the amount of entropy requested is not available within the random number generator. The cryptographic module 118 may perform cryptographic operations using the entropy provided by the PRNG 120 that is based on the lesser amount of entropy provided to the PRNG 120. In this way, the cryptographic module 402 may be able to continue operation and perform cryptographic operations using any amount of fresh entropy available.

At 712, the entropy process may continue and the entropy from the entropy source may be processed with a cryptographically secure random number generator to produce a greater number of bits of entropy. The cryptographically secure random number generator may include an AES engine that enables the entropy provided by the entropy source to be scaled in a cryptographically safe manner. Once entropy is produced by the cryptographically secure random number generator, the entropy may be provided to an entropy distribution network that distributes the entropy to the PRNGs 120 or the PRNG-dependent cryptographic modules 118

At 714, the greater number of bits of entropy from the cryptographically secure random number generator may be distributed to the cryptographic module 118 or the PRNG through the entropy distribution network. The entropy distribution network may span across large parts of the integrated circuit to provide entropy to different circuit components. Thus, the entropy distribution network may contain strong drivers and transistors that produce a large power signature. The entropy distribution network may provide entropy to the one or more PRNGs 120 or cryptographic modules 118 that request reseeding.

At 716, the cryptographic module 118 (e.g., the PRNG 120) is reseeded using the entropy received from the entropy distribution network. For example, the PRNG 120 may utilize the entropy provided from the entropy distribution network as a seed to generate pseudo-randomness for the PRNG-dependent cryptographic module 118.

At 718, the cryptographic module 118 may operate to enable cryptographic operations that utilize pseudo-randomness that is based on the reseeded entropy. For example, the cryptographic module 118 may operate to perform masking and remasking operations based on pseudo-randomness provided by the PRNG 120.

In aspects, secure PRNG reseeding as described herein may create a power signature or other channel signatures that disguise the operations of the integrated circuit. In this way, malicious attackers may be unable to determine when the integrated circuit handles sensitive information and thus, may ensure the intended operation of the integrated circuit. As such, the techniques, apparatuses, and systems disclosed herein may provide a cryptographically secure method for PRNG reseeding.

Example System

Figure 8:
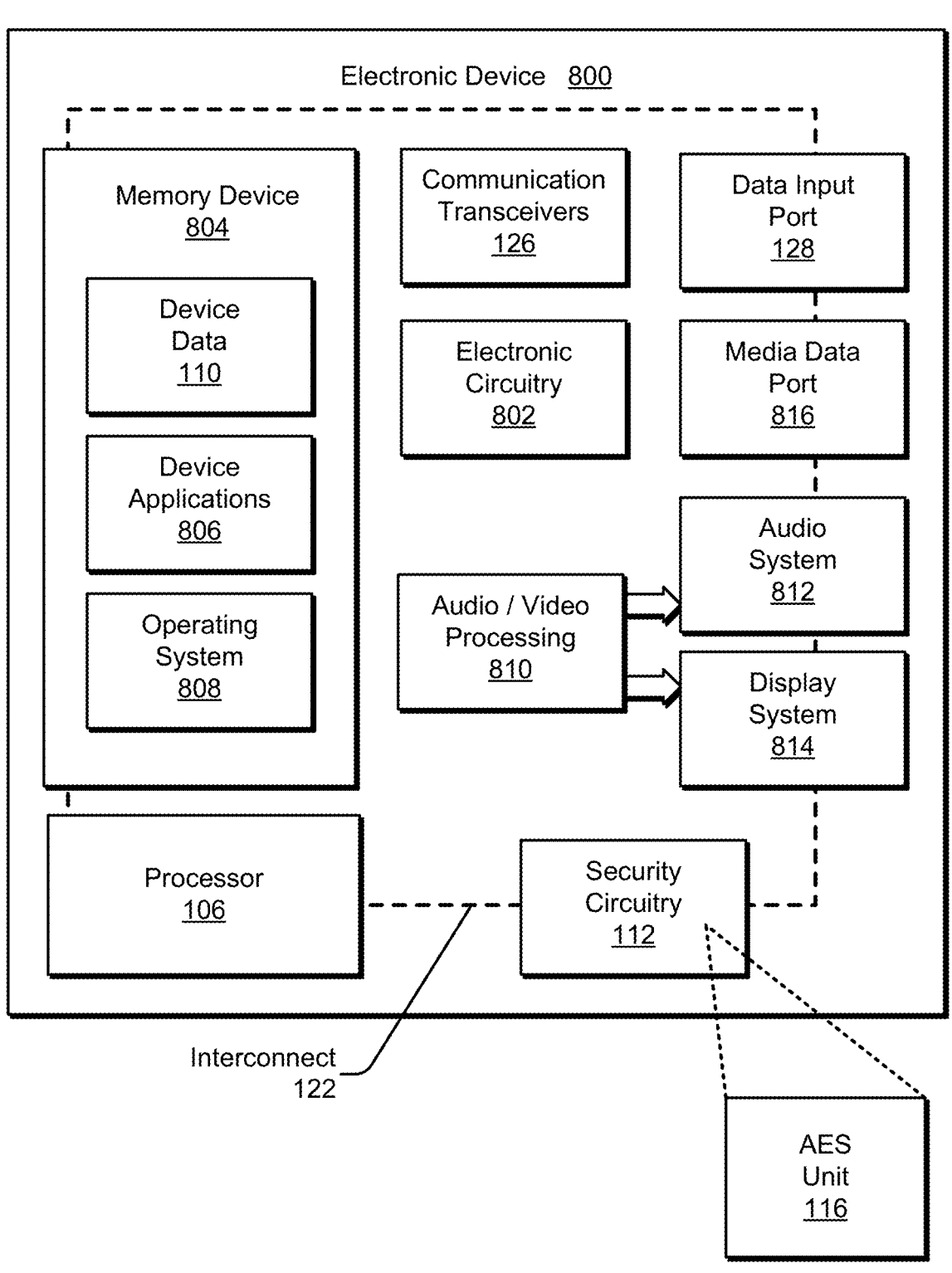
FIG. 8 illustrates an example electronic device that may implement secure PRNG reseeding.

FIG. 8 illustrates various components of an example electronic device 800 that can implement secure PRNG reseeding in accordance with one or more aspects. The electronic device 800 may be implemented as any single or multiple of a fixed, mobile, stand-alone, or embedded device; in any form of a consumer, computer, portable, user, server, communication, phone, navigation, gaming, audio, camera, messaging, media playback, and/or other type of electronic device 800, such as the smartphone that is depicted in FIG. 1 as the apparatus 102. One or more of the illustrated components may be realized as discrete components or as integrated components on at least one integrated circuit of the electronic device 800. Generally, the various components of the electronic device 800 are coupled via an interconnect 122 and/or one or more fabrics that support communication between the components in accordance with one or more aspects of secure PRNG reseeding.

The electronic device 800 can include one or more communication transceivers 126 that enable wired and/or wireless communication of device data 110, such as received data, transmitted data, or other information identified herein. Example communication transceivers 126 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (WiFi™) standards, wireless wide area network (WAN) (WWAN) radios (e.g., those that are Third Generation Partnership Project compliant (3GPP-compliant)) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The electronic device 800 may also include one or more data input ports 128 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 128 may include USB ports, coaxial cable ports, fiber optic ports for optical fiber interconnects or cabling, and other serial or parallel connectors (including internal connectors) for flash memory, DVDs, CDs, and the like. These data input ports 128 may be used to couple the electronic device to components, peripherals, or accessories such as keyboards, microphones, cameras, or other sensors.

The electronic device 800 of this example includes at least one processor 106 (e.g., any one or more of application processors, microprocessors, digital signal processors (DSPs), controllers, and the like), which can include a combined processor and memory system (e.g., implemented as part of an SoC), that processes (e.g., executes) computer-executable instructions to control operation of the device. The processor 106 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital signal processor (DSP), an application-specific integrated circuit (ASIC), a field-programmable gate array (FPGA), a complex programmable logic device (CPLD), and other implementations in silicon and/or other materials.

Alternatively or additionally, the electronic device 800 can be implemented with any one or combination of electronic circuitry, which may include software, hardware, firmware, or fixed logic circuitry that is implemented in connection with processing and control circuits, which are generally indicated at 802 (as electronic circuitry 802). This electronic circuitry 802 can implement executable or hardware-based modules (not shown in FIG. 8), such as through processing/computer-executable instructions stored on computer-readable media, through logic circuitry and/or hardware (e.g., such as an FPGA), and so forth.

In aspects, the electronic device 800 includes an interconnect 122, which may include any one or more of a system bus, interconnect, crossbar, data transfer system, or other switch fabric that couples the various components within the device to enable various aspects of signaling and/or communication with sparse encoding. A system bus or interconnect can include any one or a combination of different bus structures, such as a memory bus or memory controller, a peripheral bus, parity blocks, error correction code (ECC) blocks, a universal serial bus, and/or a processor or local bus that utilizes any of a variety of bus architectures.

The electronic device 800 also includes one or more memory devices 804 that enable data storage, examples of which include random access memory (RAM), non-volatile memory (e.g., read-only memory (ROM), flash memory, erasable programable read-only memory (EPROM), electrically erasable programable read-only memory (EEPROM)), and a disk storage device. Thus, the memory device(s) 804 can be distributed across different logical storage levels of a system as well as at different physical components. The memory device(s) 804 provides data storage mechanisms to store the device data 110, other types of code and/or data, and various device applications 806 (e.g., software applications or programs). For example, an operating system 808 can be maintained as software instructions within the memory device 804 and executed by the processor 106.

In some implementations, the electronic device 800 also includes an audio and/or video processing system 810 that processes audio data and/or passes through the audio and video data to an audio system 812 and/or to a display system 814 (e.g., a video buffer or a screen of a smartphone or camera). The audio system 812 and/or the display system 814 may include any devices that process, display, and/or otherwise render audio, video, display, and/or image data. Display data and audio signals can be communicated to an audio component and/or to a display component via an RF (radio frequency) link, S video link, HDMI (high-definition multimedia interface), composite video link, component video link, DVI (digital video interface), analog audio connection, video bus, or other similar communication link, such as a media data port 816. In some implementations, the audio system 812 and/or the display system 814 are external or separate components of the electronic device 800. Alternatively, the display system 814, for example, can be an integrated component of the example electronic device 800, such as part of an integrated touch interface.

The electronic device 800 of FIG. 8 is an example implementation of the apparatus 102 of FIG. 1, an example implementation of a device that can implement secure PRNG reseeding as described with reference to FIG. 1 through FIG. 7. The electronic device 800 can thus include security circuitry 112, which can be a separate IC chip or included as part of another IC chip or device, like the processor 106, the electronic circuitry 802, or the memory device 804. Accordingly, one or more of the illustrated components may be integrated on the same IC chip, like an SoC, or at least on a single printed circuit board (PCB).

The security circuitry 112 may include an AES unit 116 that performs cryptographically safe operations using encryption or decryption. The AES unit 116 may include any number of cryptographic modules configured to perform cryptographically safe operations using randomness or pseudo-randomness provided by an RNG or PRNG. For example, the cryptographic modules may perform masking and remasking operations to distance the channel signatures of the electronic device 800 from the produced/processed values. The security circuitry 112 may include an entropy generation circuit responsible for reseeding the PRNGs of the cryptographic modules. The entropy generation circuit may include a high-quality entropy source, a cryptographically secure random number generator, and an entropy distribution network. The principles of secure PRNG reseeding as described herein can therefore be implemented by, or in conjunction with, the electronic device 800 of FIG. 8.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for a secure cryptographic processor have been described in language specific to certain features and/or methods, the subject of the appended claims is not necessarily limited to the specific features or methods described. Rather, the specific features and methods are disclosed as example implementations for secure cryptographic processing.

Additional Examples

Examples of secure PRNG reseeding are provided below:

Example 1: A method comprising: receiving, from a pseudo-random number generator (PRNG) dependent cryptographic module that comprises a pseudo-random number generator (PRNG) configured to generate random numbers using a seed based on received entropy, a request for entropy for reseeding the PRNG-dependent cryptographic module; generating, with a random number generator and based on an entropy source, the entropy for reseeding the PRNG-dependent cryptographic module; and operating, while generating the entropy for reseeding the PRNG-dependent cryptographic module, the PRNG-dependent cryptographic module to overlap at least a portion of power consumption associated with the generating of the entropy for reseeding the PRNG-dependent cryptographic module.

Example 2: The method as recited by any of the previous examples, wherein generating the entropy with the random number generator produces a first power signature indicative of generating the entropy; and operating the PRNG-dependent cryptographic module while generating the entropy generates a second power signature that at least partially overlaps the first power signature to obscure operation of the PRNG-dependent cryptographic module or operation of the random number generator to generate the entropy.

Example 3: The method as recited by any of the previous examples, wherein operating the PRNG-dependent cryptographic module while generating the entropy generates a power signature that is not indicative of deactivating the PRNG-dependent cryptographic module without performing cryptographic operations with the PRNG-dependent cryptographic module.

Example 4: The method as recited by any of the previous examples, wherein generating the entropy for reseeding the PRNG-dependent cryptographic module comprises: generating, by an entropy source, one or more bits of entropy; processing, by a cryptographically secure random number generator and responsive to generating the one or more bits of entropy, the one or more bits of entropy to create a greater number of bits of entropy than the one or more bits of entropy; and distributing, by an entropy distribution network, the greater number of bits of entropy to the pseudo-random number generator.

Example 5: The method as recited by any of the previous examples, wherein two or more of generating the one or more bits of entropy, processing the one or more bits of entropy, or distributing the greater number of bits of entropy occurs at least in part during a same time.

Example 6: The method as recited by any of the previous examples, wherein the method further comprises performing, during generation of the entropy for reseeding the PRNG-dependent cryptographic module, operations to produce a third power signature that at least partially overlaps the first power signature or second power signature using at least one of the entropy source; the cryptographically secure random number generator; or the entropy distribution network.

Example 7: The method as recited by any of the previous examples, wherein the operations which produce the third power signature do not contribute to the generation of one or more bits of entropy, to the processing of the one or more bits of entropy to create a greater number of bits of entropy than the one or more bits of entropy, or to the distributing of the greater number of bits of entropy to the pseudo-random number generator.

Example 8: The method as recited by any of the previous examples, wherein operating the PRNG-dependent cryptographic module to overlap at least a portion of power consumption associated with the generating of the entropy for reseeding the PRNG-dependent cryptographic module comprises: receiving, by the PRNG-dependent cryptographic module, signaling indicative of the generating entropy for reseeding the PRNG-dependent cryptographic module; and operating the PRNG-dependent cryptographic module when receiving signaling indicative of the generating entropy for reseeding the PRNG-dependent cryptographic module.

Example 9: The method as recited by any of the previous examples, wherein operating the PRNG-dependent cryptographic module to produce the power signature that is not indicative of deactivating the PRNG-dependent cryptographic module comprises: activating, by the PRNG-dependent cryptographic module, a timer in response to requesting the entropy for reseeding the PRNG-dependent cryptographic module; and terminating execution of the PRNG-dependent cryptographic module in response to the timer reaching a predetermined time value if the entropy for reseeding has not been received by the PRNG-dependent cryptographic module.

Example 10: The method as recited by any of the previous examples, wherein: the method further comprises determining, by the PRNG-dependent cryptographic module, that current entropy used by the PRNG-dependent cryptographic module is below a desired quality; and receiving the request for entropy for reseeding the PRNG-dependent cryptographic module is responsive to determining that the current entropy used by the PRNG-dependent cryptographic module is below the desired quality.

Example 11: The method as recited by any of the previous examples, operating the PRNG-dependent cryptographic module to overlap at least a portion of power consumption associated with the generating of the entropy for reseeding the PRNG-dependent cryptographic module comprises performing cryptographic operations by the PRNG-dependent cryptographic module using a current entropy.

Example 12: The method as recited by any of the previous examples, further comprising: receiving, at a PRNG of the PRNG-dependent cryptographic module, the entropy for reseeding the PRNG-dependent cryptographic module; and performing, by the PRNG-dependent cryptographic module, cryptographic operations using new entropy generated by the PRNG based on the entropy for reseeding the PRNG-dependent cryptographic module.

Example 13: The method as recited by any of the previous examples, further comprising receiving, at a PRNG of the PRNG-dependent cryptographic module, a partial amount of new entropy for reseeding the PRNG-dependent cryptographic module; and performing, by the PRNG-dependent cryptographic module, cryptographic operations using the partial amount of new entropy generated by the PRNG based on the entropy for reseeding the PRNG-dependent cryptographic module; wherein the partial amount of new entropy received by the PRNG-dependent cryptographic module comprises less entropy than an amount of entropy requested for reseeding the PRNG-dependent cryptographic module.

Example 14: The method as recited by any of the previous examples, wherein operating the PRNG-dependent cryptographic while generating the entropy for reseeding the PRNG-dependent comprises operating the cryptographic module to perform cryptographic operations using the new entropy that is less than the amount of entropy requested while generating new entropy to satisfy the request for entropy.

Example 15: An apparatus comprising a cryptographic module that includes a first pseudo-random number generator (PRNG) configured to operate based on entropy; an entropy generation circuit operably coupled to the cryptographic module and comprising an entropy source, random number generator, and entropy distribution network; and a secure PRNG reseeding module configured to perform a method of any one of the examples described herein.

Example 16: An integrated circuit, comprising: an entropy generation circuit configured to generate entropy for reseeding a pseudo-random number generator (PRNG) dependent cryptographic module; the PRNG-dependent cryptographic module comprising a PRNG, the PRNG-dependent cryptographic module configured to: perform cryptographic operations using entropy provided by the PRNG; request entropy for reseeding the PRNG-dependent cryptographic module; and operate the PRNG-dependent cryptographic module during entropy generation to overlap at least a portion of power consumption associated with the generating of the entropy for reseeding the PRNG-dependent cryptographic module.

Example 17: The integrated circuit as recited by any of the previous examples, wherein the entropy generation circuit comprises: an entropy source configured to generate one or more bits of entropy; a cryptographically secure random number configured to process the one or more bits of entropy to create a greater number of bits of entropy than the one or more bits of entropy; and an entropy distribution network configured to distribute the greater number of bits of entropy to the pseudo-random number generator.

Example 18: The integrated circuit as recited by any of the previous examples, wherein one or more of the entropy source, the cryptographically secure random number generator, or the entropy distribution network is further configured to perform operations to produce a power signature that at least partially overlaps the portion of power consumption associated with the generating of the entropy for reseeding the PRNG-dependent cryptographic module.

Example 19: The integrated circuit as recited by any of the previous examples, wherein the PRNG-dependent cryptographic module is configured to operate the PRNG-dependent cryptographic module to produce a power signature that is not indicative of deactivating the PRNG-dependent cryptographic module without performing cryptographic operations with the PRNG-dependent cryptographic module.

Example 20: The integrated circuit as recited by any of the previous examples, wherein the PRNG-dependent cryptographic module is further configured to determine that a quality of a current entropy is below a predetermined quality; and request entropy for reseeding the PRNG-dependent cryptographic module responsive to determining that the quality of the current entropy is below the predetermined quality.

Example 21: The integrated circuit as recited by any of the previous examples, wherein the PRNG-dependent cryptographic module is configured to operate the PRNG-dependent cryptographic module during entropy generation using the current entropy to overlap at least the portion of power consumption associated with the generating of the entropy for reseeding the PRNG-dependent cryptographic module.

Example 22: The integrated circuit as recited by any of the previous examples, wherein: the PRNG is further configured to receive the entropy for reseeding the PRNG-dependent cryptographic module; and generate new entropy based on the entropy for reseeding the PRNG-dependent cryptographic module; and the PRNG-dependent cryptographic module is further configured to: receive the new entropy from the PRNG; and perform cryptographic operations based on the new entropy.

CONCLUSION

Although aspects of the described apparatuses, systems, and methods for implementing secure PRNG reseeding have been described in language specific to features and/or methods, the subject of the appended claims is, as recited by any of the previous examples not necessarily limited to the specific features or methods described. Rather, the specific features and methods are disclosed as example implementations of secure PRNG reseeding, and other equivalent features and methods are intended to be within the scope of the appended claims. Further, various aspects of secure PRNG reseeding are described, and it is to be appreciated that each described aspect can be implemented independently or in connection with one or more other described aspects.

What is claimed is:

1. A method comprising:

receiving, from a pseudo-random number generator (PRNG)-dependent cryptographic module that comprises a PRNG configured to generate random numbers using a seed based on received entropy, a request for entropy for reseeding the PRNG-dependent cryptographic module;

generating, with an entropy source, the entropy for reseeding the PRNG-dependent cryptographic module; and operating, while generating the entropy for reseeding the PRNG-dependent cryptographic module, the PRNG-dependent cryptographic module to overlap at least a portion of power consumption associated with operating the PRNG-dependent cryptographic module with power consumption associated with the generating of the entropy for reseeding the PRNG-dependent cryptographic module.

2. The method as recited in claim 1, wherein:

generating the entropy with the entropy source produces a first power signature indicative of generating the entropy; and operating the PRNG-dependent cryptographic module while generating the entropy generates a second power signature that at least partially overlaps the first power signature to obscure operation of the PRNG-dependent cryptographic module or operation of the entropy source to generate the entropy.

3. The method as recited in claim 1, wherein operating the PRNG-dependent cryptographic module while generating the entropy generates a power signature that is not indicative of deactivating the PRNG-dependent cryptographic module without performing cryptographic operations with the PRNG-dependent cryptographic module.

4. The method as recited in claim 1, wherein generating the entropy for reseeding the PRNG-dependent cryptographic module comprises:

generating, by the entropy source, one or more bits of entropy;

processing, by a cryptographically secure random number generator and responsive to generating the one or more bits of entropy, the one or more bits of entropy to create a greater number of bits of entropy than the one or more bits of entropy; and distributing, by an entropy distribution network, the greater number of bits of entropy to the PRNG.

5. The method as recited in claim 4, wherein two or more of generating the one or more bits of entropy, processing the one or more bits of entropy, or distributing the greater number of bits of entropy occurs at least in part during a same time.

6. The method as recited in claim 5, wherein the method further comprises performing, during generation of the entropy for reseeding the PRNG-dependent cryptographic module, operations to produce a third power signature that at least partially masks a first power signature associated with the entropy source or a second power signature associated with the PRNG-dependent cryptographic module using at least one of:

the entropy source;

the cryptographically secure random number generator; or the entropy distribution network.

7. The method as recited in claim 6 in which the operations which produce the third power signature do not contribute to the generation of one or more bits of entropy, to the processing of the one or more bits of entropy to create a greater number of bits of entropy than the one or more bits of entropy, or to the distributing of the greater number of bits of entropy to the PRNG.

8. The method as recited in claim 1, wherein operating the PRNG-dependent cryptographic module to overlap at least a portion of power consumption associated with the generating of the entropy for reseeding the PRNG-dependent cryptographic module comprises:

receiving, by the PRNG-dependent cryptographic module, signaling indicative of the generating of the entropy for reseeding the PRNG-dependent cryptographic module; and operating the PRNG-dependent cryptographic module when receiving signaling indicative of the generating of the entropy for reseeding the PRNG-dependent cryptographic module.

9. The method as recited in claim 3, wherein operating the PRNG-dependent cryptographic module to produce the power signature that is not indicative of deactivating the PRNG-dependent cryptographic module comprises:

activating, by the PRNG-dependent cryptographic module, a timer in response to requesting the entropy for reseeding the PRNG-dependent cryptographic module; and terminating execution of the PRNG-dependent cryptographic module in response to the timer reaching a predetermined time value if the entropy for reseeding has not been received by the PRNG-dependent cryptographic module.

10. The method as recited in claim 9, wherein:

the method further comprises determining, by the PRNG-dependent cryptographic module, that current entropy used by the PRNG-dependent cryptographic module is below a desired quality; and receiving the request for entropy for reseeding the PRNG-dependent cryptographic module is responsive to determining that the current entropy used by the PRNG-dependent cryptographic module is below the desired quality.

11. The method as recited in claim 1, wherein operating the PRNG-dependent cryptographic module to overlap at least a portion of power consumption associated with the generating of the entropy for reseeding the PRNG-dependent cryptographic module comprises performing cryptographic operations by the PRNG-dependent cryptographic module using a current entropy.

12. The method as recited in claim 1, further comprising:

receiving, at the PRNG of the PRNG-dependent cryptographic module, new entropy for reseeding the PRNG-dependent cryptographic module; and performing, by the PRNG-dependent cryptographic module, cryptographic operations using the new entropy generated by the PRNG based on the entropy for reseeding the PRNG-dependent cryptographic module.

13. The method as recited in claim 1, further comprising:

receiving, at the PRNG of the PRNG-dependent cryptographic module, a partial amount of new entropy for reseeding the PRNG-dependent cryptographic module; and performing, by the PRNG-dependent cryptographic module, cryptographic operations using the partial amount of new entropy generated by the PRNG based on the entropy for reseeding the PRNG-dependent cryptographic module;

wherein the partial amount of new entropy received by the PRNG-dependent cryptographic module comprises less entropy than an amount of entropy requested for reseeding the PRNG-dependent cryptographic module.

14. The method as recited in claim 13, wherein operating the PRNG-dependent cryptographic module while generating the entropy for reseeding the PRNG-dependent cryptographic module comprises operating the PRNG-dependent cryptographic module to perform cryptographic operations using the new entropy that is less than the amount of entropy requested while generating new entropy to satisfy the request for entropy.

15. An apparatus comprising:

a pseudo-random number generator (PRNG)-dependent cryptographic module that includes a PRNG configured to generate random numbers using a seed based on entropy;

an entropy generation circuit operably coupled to the PRNG-dependent cryptographic module and comprising an entropy source, a random number generator, and an entropy distribution network; and a secure PRNG reseeding module configured to:

receive a request for entropy for reseeding the PRNG-dependent cryptographic module;

generate, using the entropy generation circuit and based on the entropy source, the entropy for reseeding the PRNG-dependent cryptographic module; and operate, while generating the entropy for reseeding the PRNG-dependent cryptographic module, the PRNG-dependent cryptographic module to overlap at least a portion of power consumption associated with operating the PRNG-dependent cryptographic module with power consumption associated with the generating of the entropy for reseeding the PRNG-dependent cryptographic module.

16. The apparatus as recited in claim 15, wherein the PRNG-dependent cryptographic module, while generating the entropy, is further configured to generate a power signature that is not indicative of deactivating the PRNG-dependent cryptographic module without performing cryptographic operations with the PRNG-dependent cryptographic module.

17. The apparatus as recited in claim 15, wherein:

the entropy generation circuit is further configured to produce a first power signature indicative of generating the entropy; and the PRNG-dependent cryptographic module is further configured to generate a second power signature, while generating the entropy, that at least partially overlaps the first power signature to obscure operation of the PRNG-dependent cryptographic module or operation of the random number generator to generate entropy.

18. The apparatus as recited in claim 17, wherein the entropy generation circuit configured to generate the entropy for reseeding is further configured to:

generate, by the entropy source, one or more bits of entropy;

process, by the random number generator and responsive to the generation of the one or more bits of entropy, the one or more bits of entropy to create a greater number of bits of entropy than the one or more bits of entropy; and distribute, by the entropy distribution network, the greater number of bits of entropy to the PRNG.

19. The apparatus as recited in claim 18, wherein two or more of the generation of the one or more bits of entropy, the processing of the one or more bits of entropy, or the distribution of the greater number of bits of entropy occurs at least partially concurrently.

20. The apparatus as recited in claim 19, wherein at least one of the entropy source, the random number generator, or the entropy distribution network, is configured to perform operations to produce a third power signature that at least partially masks the first power signature or the second power signature during generation of the entropy for reseeding the PRNG-dependent cryptographic module.

* * * * *